(12) United States Patent
Shindo

(10) Patent No.: US 9,025,987 B2
(45) Date of Patent: May 5, 2015

(54) PRINTING CONTROL APPARATUS AND PRINTING CONTROL METHOD

(75) Inventor: Yukihiro Shindo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 399 days.

(21) Appl. No.: 13/442,824

(22) Filed: Apr. 9, 2012

(65) Prior Publication Data

US 2012/0269525 A1 Oct. 25, 2012

(30) Foreign Application Priority Data

Apr. 19, 2011 (JP) ................. 2011-093510

(51) Int. Cl.
| | | |
|---|---|---|
| G06F 3/00 | (2006.01) | |
| G06K 15/00 | (2006.01) | |
| G06F 3/12 | (2006.01) | |
| G06K 15/12 | (2006.01) | |
| G06K 15/02 | (2006.01) | |

(52) U.S. Cl.
CPC ............ *G06F 3/1208* (2013.01); *G06K 15/129* (2013.01); *G06K 15/1809* (2013.01); *G06F 3/1219* (2013.01); *G06F 3/1239* (2013.01); *G06F 3/1285* (2013.01)

(58) Field of Classification Search
CPC .............. G03G 2215/0167; G03G 2215/017; G03G 2215/0174; G03G 2215/0177; G03G 2215/018

USPC ......... 399/39, 40, 54, 81, 183, 184, 223, 228, 399/231, 226, 227; 358/1.9, 1.18

See application file for complete search history.

(56) References Cited

U.S. PATENT DOCUMENTS

| | | | | |
|---|---|---|---|---|
| 8,190,076 B2 * | 5/2012 | Omata | ........................ | 399/341 |
| 8,229,340 B2 * | 7/2012 | Shiozawa | ...................... | 399/341 |
| 8,335,012 B2 * | 12/2012 | Iguchi | ............................ | 358/1.9 |
| 8,345,317 B2 * | 1/2013 | Makino et al. | ............... | 358/3.28 |
| 8,400,674 B2 * | 3/2013 | Igarashi | ........................ | 358/1.9 |
| 8,675,248 B2 * | 3/2014 | Matsushita et al. | ............ | 358/1.9 |
| 8,699,057 B2 * | 4/2014 | Ohno | .......................... | 358/1.15 |

FOREIGN PATENT DOCUMENTS

| | | | | |
|---|---|---|---|---|
| JP | 2006-309685 A | | 11/2006 | |
| JP | 2007034040 A | * | 2/2007 | |
| JP | 2008-145595 A | | 6/2008 | |
| JP | 2010002620 A | * | 1/2010 | |
| JP | 2010066299 A | * | 3/2010 | |

\* cited by examiner

*Primary Examiner* — Robert Beatty

(74) *Attorney, Agent, or Firm* — Fitzpatrick, Cella, Harper & Scinto

(57) ABSTRACT

A printing control apparatus determines whether a limit to prohibit printing using a spot color printing material is imposed on, out of a plurality of objects included in document data, an object set to be printed using the spot color printing material. Upon determining that the limit to prohibit the printing using the spot color printing material is imposed on the object set to be printed using the spot color printing material, control is performed to prohibit issuance of a rendering command to print the object using the spot color printing material.

12 Claims, 24 Drawing Sheets

FIG. 4

F I G. 5
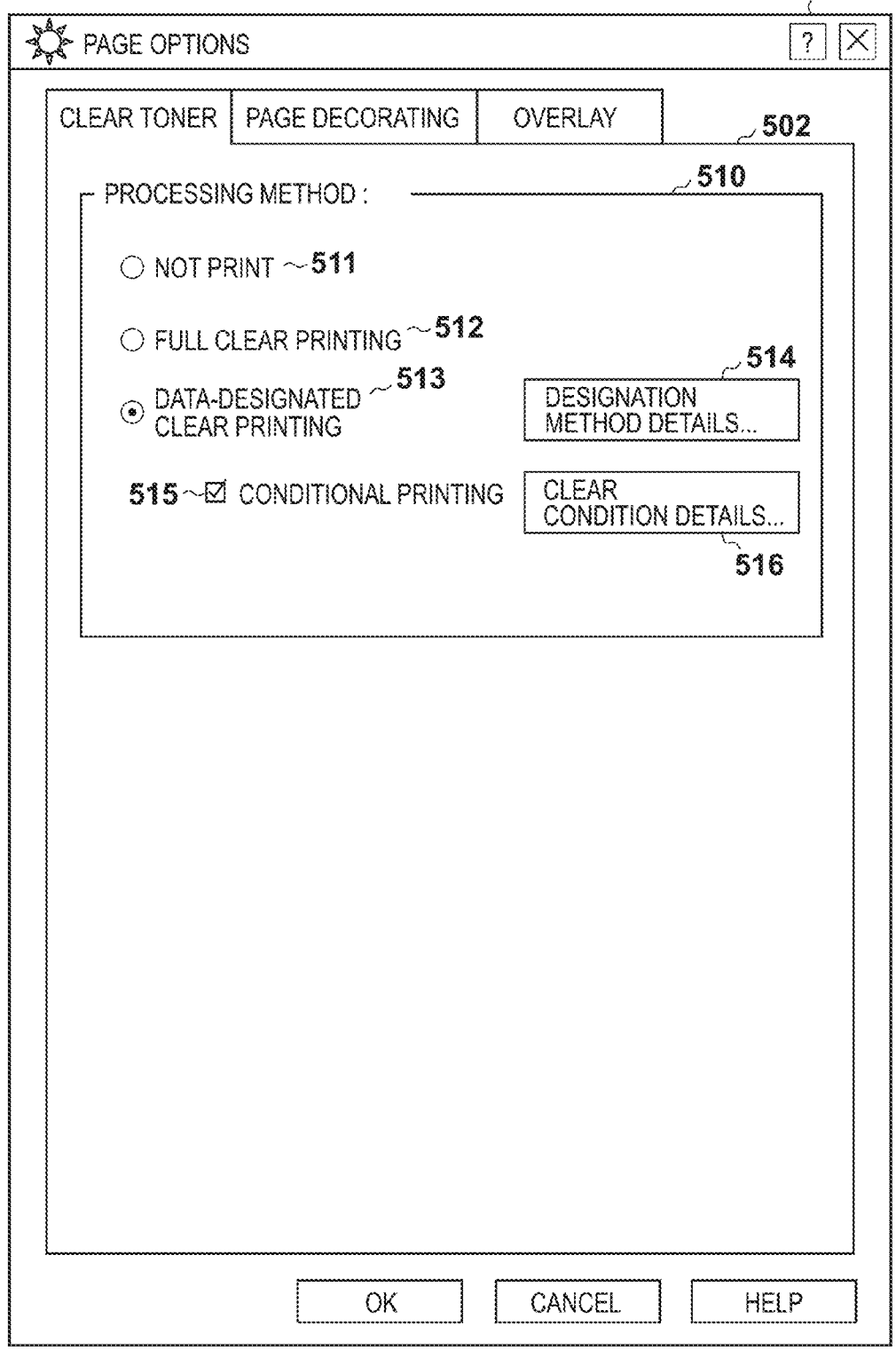

SPOOL FILE (CLEAR TONER JOB)

```
<Begin Job>
    <Begin Page>
        [RENDERING OBJECT N03]
        [RENDERING OBJECT N05]
        [RENDERING OBJECT N07]
        [RENDERING OBJECT N09]
        <Begin ClearToner ON>
            [RENDERING OBJECT N01]
            [RENDERING OBJECT N02]
            [RENDERING OBJECT N04]
            [RENDERING OBJECT N06]
            [RENDERING OBJECT N08]
            [RENDERING OBJECT N10]
        <End ClearToner ON>
    <End Page>
<End Job>
```

F I G. 14

SPOOL FILE (CLEAR TONER JOB)

```
<Begin Job>
    <Begin Page>
        [RENDERING OBJECT N03]
        [RENDERING OBJECT N05]
        [RENDERING OBJECT N07]
        [RENDERING OBJECT N09]
        <Begin ClearToner ON>
            [RENDERING OBJECT N02]
            [RENDERING OBJECT N04]
            [RENDERING OBJECT N06]
        <End ClearToner ON>
        <Begin ClearToner OFF>
            [RENDERING OBJECT N01]
            [RENDERING OBJECT N08]
            [RENDERING OBJECT N10]
        <End ClearToner OFF>
    <End Page>
<End Job>
```

F I G. 20
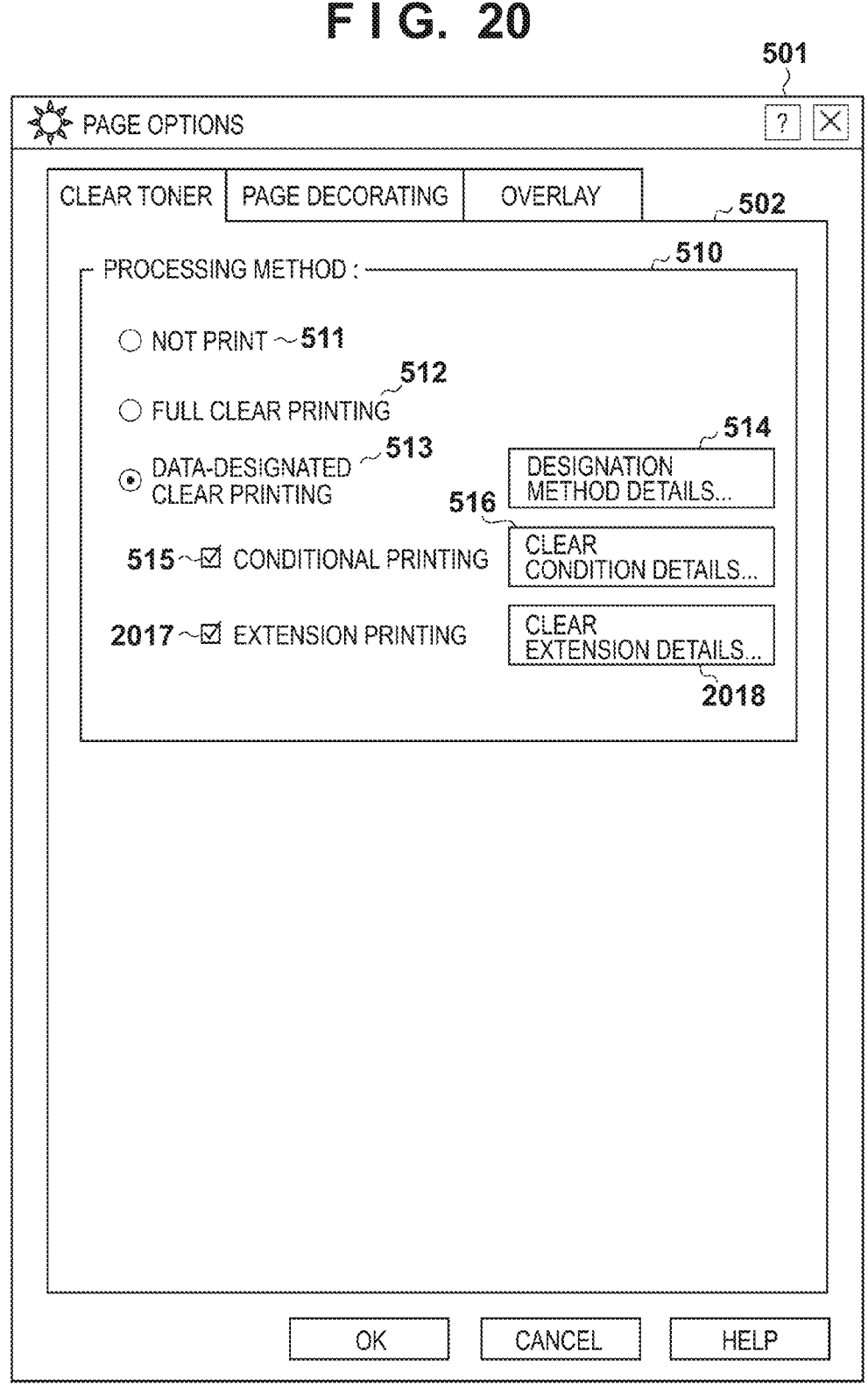

DOCUMENT DATA (A4 PRINTING DESIGNATED)

OUTPUT PRODUCT (A4 PAPER), 100% OUTPUT

OUTPUT PRODUCT (A4 PAPER), 70% OUTPUT

PRINTING CONTROL APPARATUS AND PRINTING CONTROL METHOD

BACKGROUND OF THE INVENTION

1. Field of the Invention

The present invention relates to a technique of printing using a spot color printing material.

2. Description of the Related Art

There has recently been a growth in color laser printers using so-called "spot color printing materials" in addition to normal color toners such as CMYK (cyan, magenta, yellow, and black). The spot color printing materials include color toners of having colors such as red, blue, and white other than CMYK and also colorless toners such as a transparent toner (to be referred to as a "clear toner" hereinafter) to be used to add a transparent image to a printed product.

The user can generate a high-value-added printed product by selectively using various kinds of spot color printing materials in accordance with the application purpose. For example, a printing apparatus using a clear toner can apply clear toner printing to the entire surface or part of a paper sheet as well as color printing using the CMYK color toners, thereby attaining a glossy or shining appearance like a photo (Japanese Patent Laid-Open No. 2006-309685).

To execute printing using the clear toner, an image processing apparatus incorporates a mechanism for transferring the clear toner and the CMYK toners that are colored toners to a paper sheet and then fixing the colored toner images and the clear toner image to the paper sheet by one fixing. An output product using the clear toner is thus created.

However, addition of the arrangement for printing using the clear toner poses problems. For example, a problem concerning the applied toner amount arises. More specifically, an image processing apparatus has a limit (applied amount limit) to the toner amount fixable by one fixing per unit area of the printing target paper. Hence, to suppress the toner amount within the applied amount limit, the clear toner cannot sufficiently be used in a region where the CMYK toners are used in large amounts.

An image processing system has been proposed, which is constructed by connecting an image processing apparatus for printing using colored toners and an image processing apparatus for printing using a clear toner so as to create an output product using the clear toner (Japanese Patent Laid-Open No. 2008-145595). For example, there is provided, for a user who uses a clear toner, an image processing system formed by connecting an image processing apparatus (apparatus of the preceding stage) for performing transfer/fixing and printing using colored toners and an image processing apparatus (apparatus of the succeeding stage) for performing transfer/fixing and printing using a clear toner. This arrangement allows to sufficiently use both the CMYK toners and the clear toner for a print target object.

However, it is difficult to flexibly switch the clear toner usage method for each page.

For example, in Japanese Patent Laid-Open No. 2006-309685, to perform printing using the clear toner, the user designates the range to be printed using the clear toner on the user interface of the printer driver. If the user wants to change the designated range on the page basis in a multiple page job, the range designation needs to be done in each page. Then, only the image data of the designated portion is printed using the clear toner. Printing using the clear toner may be designated using an α plane or the like. Note that the description in the following embodiments will be done assuming an application supporting clear data addition.

At this time, for example, if the user wants to print not to check the printing effect of the clear toner but to check the page composition, the settings are changed not to use the clear toner in a full clear page so as to suppress waste of toners. In the conventional method, however, if the range designation has been done for full clear printing, the clear toner printing designation needs to be canceled for the check printing. If the system allows to specifically designate the clear toner printing range in all pages, the operation of canceling the clear toner printing designation is very cumbersome for the user. In addition, since the settings for the page composition check printing need to be different from the settings for actual printing using the clear toner, the risk to cause an error is high.

Furthermore, when the clear toner is partially applied to an image, the range designation is often done to overcoat an object.

For example, examine a case in which the clear toner is applied to a black line object. In this case, without much concern for printing, the document data creator designs the data of the portion to be printed using the clear toner in the same line width as that of a black line of the background of the region to be printed using the clear toner. However, when the black line is reproduced using the four CMYK toners, misregistration may occur between the colors, and the line may be reproduced thicker than that reproduced using only the K toner. This causes misregistration between the clear toner itself and other colors. That is, to implement overcoat by the clear toner, the lines need to be printed thicker than the black line object in the background range.

The above-described contents also apply to an image object and a graphic. To overcoat an image object or a graphic with the clear toner, the document data creator designs the clear data in the same size as that of the image object or the graphic.

However, since the misregistration occurs between the CMYK toners and the clear toner, the portion where the CMYK toners are printed cannot be overcoated with the clear toner in the same size.

Especially, in the printing system including the printing apparatuses connected to each other, the first printing apparatus of the preceding stage performs printing using the color toners, and the second printing apparatus of the succeeding stage then performs printing using the clear toner. That is, since an image is printed on one paper sheet using the plurality of apparatuses, the registration errors may occur in printing at a higher possibility. In reduction printing or reduction layout printing as well, the misregistration amount feels large because of the small object size, although the misregistration amount is the same as in normal size printing.

SUMMARY OF THE INVENTION

The present invention provides an apparatus and method for allowing to flexibly switch, based on condition settings at the time of printing, the printing method of an object for which printing using a spot color printing material is set.

According to one aspect of the present invention, there is provided a printing control apparatus comprising: a determination unit that determines whether a limit to prohibit printing using a spot color printing material is imposed on, out of a plurality of objects included in document data, an object set to be printed using the spot color printing material; and a control unit that controls to prohibit issuance of a rendering command to print the object using the spot color printing material when the determination unit has determined that the limit to prohibit the printing using the spot color printing material is imposed on the object set to be printed using the spot color printing material.

Further features of the present invention will become apparent from the following description of exemplary embodiments (with reference to the attached drawings).

BRIEF DESCRIPTION OF THE DRAWINGS

FIG. 4 is a view showing an example of a print setting dialogue screen;

FIG. 5 is a view showing an example of a page option dialogue screen;

FIG. 8 is a view showing an example of a print quality sheet screen to do settings concerning print quality;

FIG. 13 is a view showing PDL data as a print job;

FIG. 14 is a view showing PDL data as a print job;

FIG. 20 is a view showing a screen obtained by adding extension printing and a detail button to FIG. 5;

DESCRIPTION OF THE EMBODIMENTS

The modes for carrying out the present invention will now be described in detail with reference to the accompanying drawings. In the following explanation, a clear toner that is a transparent printing material will be exemplified as a spot color printing material.

Not the clear toner but a light color toner, a spot color toner of red, green, or the like, or another transparent printing material such as transparent ink may be used. The clear toner is a transparent printing material that features adding a transparent image. Using the clear toner enables to express a glossy or shining appearance, unlike printing using only colored toners.

First Embodiment

Figure 1:
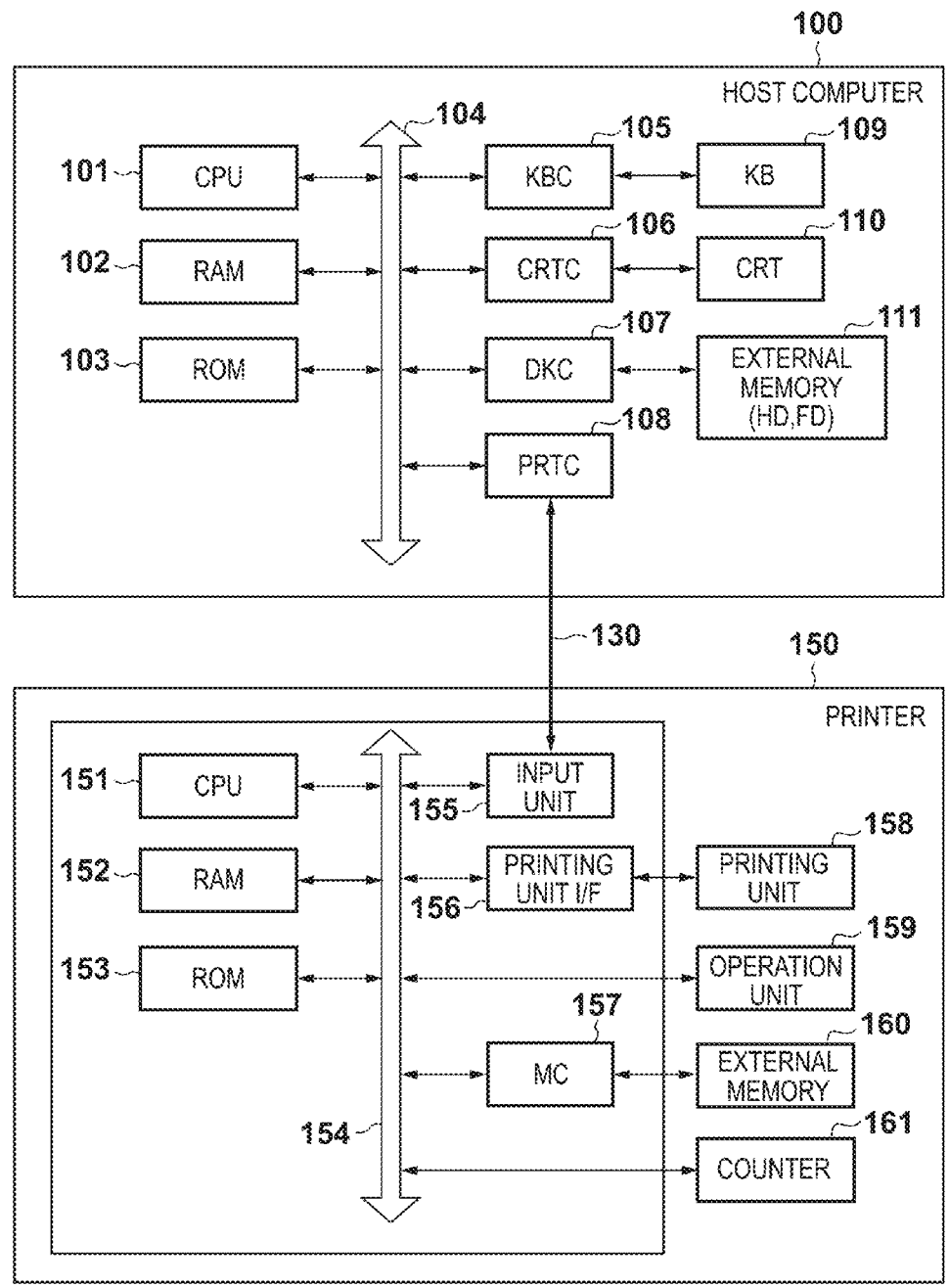
FIG. 1 is a block diagram showing an example of the arrangement of a printing system.

FIG. 1 is a block diagram showing an example of the arrangement of a printing system. A host computer 100 functions as a printing control apparatus. A CPU 101 of the host computer 100 generally controls the units to be described later. A RAM 102 is a memory to be used as the main memory of the CPU 101 or a work area upon executing processing. A ROM 103 stores control programs and the like. A system bus 104 connects the units. A keyboard controller (KBC) 105 controls key input from a keyboard 109 or a pointing device (not shown). A CRT controller (CRTC) 106 controls display of a CRT display (CRT) 110. A disk controller (DKC) 107 controls access to an external memory 111 (for example, hard disk). The external memory 111 stores boot programs, various kinds of applications, font data, user files, edit files, a printer control command generation program (to be referred to as a printer driver hereinafter), and the like in addition to an OS that is the control program of the CPU 101. A printer controller (PRTC) 108 is connected to a printer 150 via a bidirectional interface 130 to execute communication control processing for the printer 150.

A CPU 151 of the printer 150 generally controls the units to be described later, like the CPU 101 of the host computer 100. A RAM 152 is a memory to be used as the main memory of the CPU 151 or a work area upon executing processing. A ROM 153 stores font data and the like as well as control programs. A system bus 154 connects the units. An input unit 155 receives PDL data from the host computer 100 and also sends various kinds of information in the printer 150 to the host computer 100 via the bidirectional interface 130. A memory controller (MC) 157 controls access to an external memory 160 formed from a hard disk drive (HDD), an IC card, or the like. The external memory 160 stores emulation programs, form data, and the like. Note that the printer need not always include only one external memory 160. The printer may be configured to connect a plurality of external memories including option cards storing programs for interpreting printer control languages of different language systems in addition to internal fonts.

A printing unit (printer engine) 158 receives an image signal serving as output information via a printing unit I/F 156 and prints the image on a medium (paper sheet). An operation panel 159 includes switches to be used by the user to input various kinds of operation instructions and LED indicators. A charge counter 161 counts up in accordance with execution of color printing using CMYK toners (printing using colored printing materials) and clear toner printing (printing using a clear toner).

Figure 2:
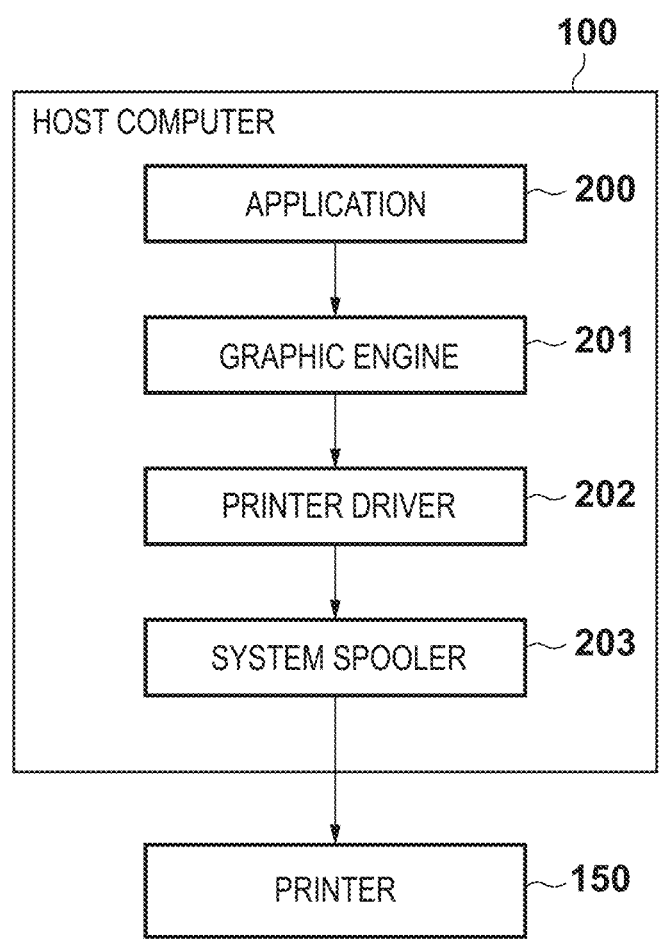
FIG. 2 is a block diagram showing a software configuration concerning print processing of a host computer.

FIG. 2 is a block diagram showing a software configuration concerning print processing of the host computer 100. An application 200 generates various kinds of document data. A graphic engine 201 sets the output of the application 200 in a printer driver 202 to cause the printer 150 to output the document data generated by the application 200. More specifically, the graphic engine 201 converts a GDI function received from the application 200 into a DDI function and outputs the converted DDI function to the printer driver 202. Note that GDI and DDI stand for "Graphic Device Interface" and "Device Driver Interface", respectively.

The printer driver 202 converts the image data into a control command recognizable by the printer 150, for example, PDL (Page Description Language) based on the DDI function received from the graphic engine 201. The converted command is output to a system spooler 203. The system spooler 203 receives the converted control command from the printer driver 202 and outputs it to the printer 150 via the bidirectional interface 130 as print data (PDL data). Note that the application 200, the graphic engine 201, the printer driver 202, and the system spooler 203 are stored in the external memory 111. These programs are loaded to the RAM 102 and executed by the CPU 101 based on an instruction from the OS or another program that uses the programs.

Figure 3:
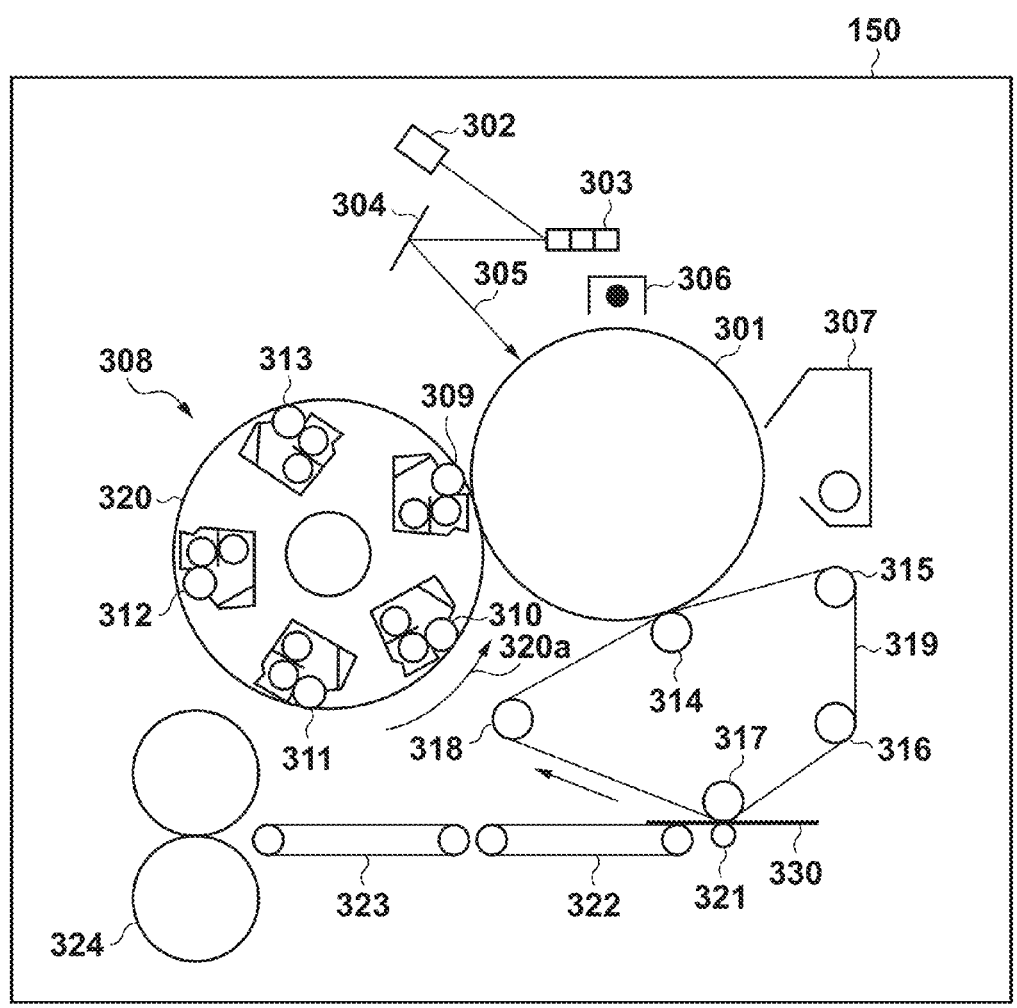
FIG. 3 is a sectional view showing the internal arrangement of a printer.

FIG. 3 is a sectional view showing the internal arrangement of the printer 150. A charger 306 serving as a charging means and a laser light source 302 serving as an exposure means are arranged around a drum-shaped electrophotographic photosensitive member (photosensitive drum) 301 serving as an image carrier. A polygon mirror 303 and a mirror 304 which reflect an optical image 305 emitted by the laser light source 302, a cleaner 307 serving as a cleaning means, and a rotary developer 308 are also arranged. An intermediate transfer belt 319 that is an intermediate transfer member serving as a second image carrier loops over rollers 315, 316, 317, and 318 so as to face the photosensitive drum 301. A primary transfer roller 314 serving as a primary transfer means and a secondary transfer roller 321 serving as a secondary transfer means are provided on the intermediate transfer belt 319.

The rotary developer 308 includes a developing rotary 320 that is a rotating member arranged to face the photosensitive drum 301 and supported so as to be freely rotatable. In this example, the developing rotary 320 is provided with color toner developers for four colors and a spot color printing material developer for one color, which serve as a plurality of developing means. The color toner developers for four colors are a yellow toner developer 309, a magenta toner developer 310, a cyan toner developer 311, and a black toner developer 312. The spot color printing material developer for one color is a clear toner developer 313 that uses a spot color printing material for glossiness adjustment in this example.

An operation when forming a full-color image will be described here. First, the charger 306 charges the surface of the photosensitive drum 301. The laser light source 302 emits the optical image 305 to the surface of the charged photosensitive drum 301 based on an image signal or the like sent from the host computer 100. An electrostatic image (latent image) is thus formed on the photosensitive drum 301 and developed by the rotary developer 308. That is, the developing rotary 320 rotates in the direction of an arrow 320a to move a predetermined developer to the developing portion facing the surface of the photosensitive drum 301. After that, the developer forms a developing agent image (toner image) on the photosensitive drum 301. The toner image formed on the photosensitive drum 301 is transferred to the intermediate transfer belt 319 at the portion (primary transfer portion) where the photosensitive drum 301 faces the intermediate transfer belt 319. Note that the primary transfer residual toner that remains on the photosensitive drum 301 after the primary transfer process is removed by the cleaner 307.

The above-described operation is repeated to sequentially overlay the yellow toner, the magenta toner, the cyan toner, the black toner, and the transparent toner (clear toner), thereby forming a multiple toner image on the intermediate transfer belt 319. The multiple toner image formed on the intermediate transfer belt 319 is transferred to a printing medium (printing paper sheet) 330 at the portion (secondary transfer portion) where the secondary transfer roller 321 faces the intermediate transfer belt 319. Note that the secondary transfer residual toner that remains on the intermediate transfer belt 319 after the secondary transfer process is removed by a transfer belt cleaner (not shown).

The printing medium 330 is conveyed from a printing medium supplier (not shown) to the secondary transfer portion in synchronism with the timing the leading edge of the multiple toner image on the intermediate transfer belt 319 is conveyed to the secondary transfer portion. The printing medium 330 with the transferred toner image is conveyed to a roller fixing device 324 serving as a fixing means by conveyance belts 322 and 323. The printing medium 330 is pressed/heated by the roller fixing device 324. The image formed by the pressed/heated toners is fixed on the printing medium 330. The printing medium 330 that has undergone the fixing is discharged from the apparatus. In this way, the printer 150 forms an image on the printing medium 330.

The user interface of the printer driver 202 will be described next using the screen of the first layer shown in FIG. 4. A print setting dialogue screen 401 can be opened from a printer folder managed by the OS or the print setting screen of the application 200. Upon detecting a user instruction, the CPU 101 executes the printer driver 202 loaded to the RAM 102, thereby displaying the print setting dialogue screen 401 on the CRT 110. The print setting dialogue screen 401 includes a page setup tag, a finishing tag, a paper source tag, and a quality tag. In this example, the page setup tag is selected to display a page setup sheet 402 that allows to do basic print settings. When the user presses a page option button 403 on the page setup sheet 402, various options to be executed by the printer driver 202 can be set, including page decorating and overlay as well as settings concerning the clear toner.

FIG. 5 is a view showing the screen of the second layer displayed by pressing the page option button 403. This screen is a page option dialogue screen 501. The page option dialogue screen 501 includes a clear toner tag, a page decoration tag, and an overlay tag. In this example, the clear toner tag is selected to display a clear toner setting screen 502 to designate the processing method when using the clear toner.

A processing method region 510 in the clear toner setting screen 502 includes the following buttons. The user can select whether to perform printing using the clear toner, whether to print the whole page surface using the clear toner upon printing using the clear toner, or whether to perform printing using the clear toner for data designated by data designation. Radio buttons 511 to 513 are provided to select one of the processing methods. Printing the whole page surface using the clear toner will be referred to as full clear printing. Performing printing using the clear toner for designated data will be referred to as data-designated clear printing.

When the user selects the radio button 511 for "not print", the printer driver 202 instructs the printer 150 to perform normal color job processing without using the clear toner (normal color print processing using the CMYK color toners). At this time, even when the document data generated by the application 200 includes clear toner information, printing using the clear toner is not performed.

The clear toner information is generated by the application and represents that printing using the clear toner is designated.

When the user selects the radio button 512 for "full clear printing", the printer driver 202 instructs the printer 150 to perform full clear job processing (normal color job processing+processing of applying the clear toner all over the page). At this time, printing using the clear toner is performed for the whole page surface independently of the document data generated by the application 200.

The full clear job is processing of applying the clear toner to the whole page surface without determining the region to be printed on the page by the color job. In this case, when "bordered printing" that is printing with the margin of the printing medium left upon printing is designated, the clear toner is applied to the whole page surface corresponding to the effective printing region except the margin. On the other hand, when "borderless printing" is designated, the clear toner is applied to the whole page surface within the effective printing region.

When the user selects the radio button 513 for "data-designated clear printing", the printer driver 202 instructs the printer 150 to perform data-designated clear job processing. The data-designated clear job processing is normal color job processing+processing of applying the clear toner to a region designated using the document data. When performing the data-designated clear printing, the user does more detailed settings in a screen (not shown) displayed by pressing a designation method detail button 514.

As for the designation method of the data-designated clear printing, when clear data (for example, α plane) is added to a plurality of objects of the document data created by the application 200 in addition to the normal color data (for example, RGB or CMYK), the designation is done in accordance with the clear data. Alternatively, a range designated in the setting screen of the printer driver 202 is set as the clear printing region, as described in Japanese Patent Laid-Open No. 2006-309685. Two examples of the designation method of the data-designated clear printing have been described above. However, the present invention is not limited to this. The clear printing can be instructed using an arbitrary designation method without departing from the scope of the present invention.

For the "data-designated clear printing", a check box 515 of conditional printing is provided, which allows to switch whether to narrow the printing to only objects that satisfy conditions out of the clear printing information designated using the document data. The conditional printing is used in, for example, test printing. Advanced settings of the conditions to be used to narrow the printing are done in the screen of the third layer displayed by pressing a clear condition detail button 516.

The above description has been done with reference to FIG. 5. The instruction to the printer 150 can be done using a PDL command or by sending another control command to the printer 150.

Figure 6:
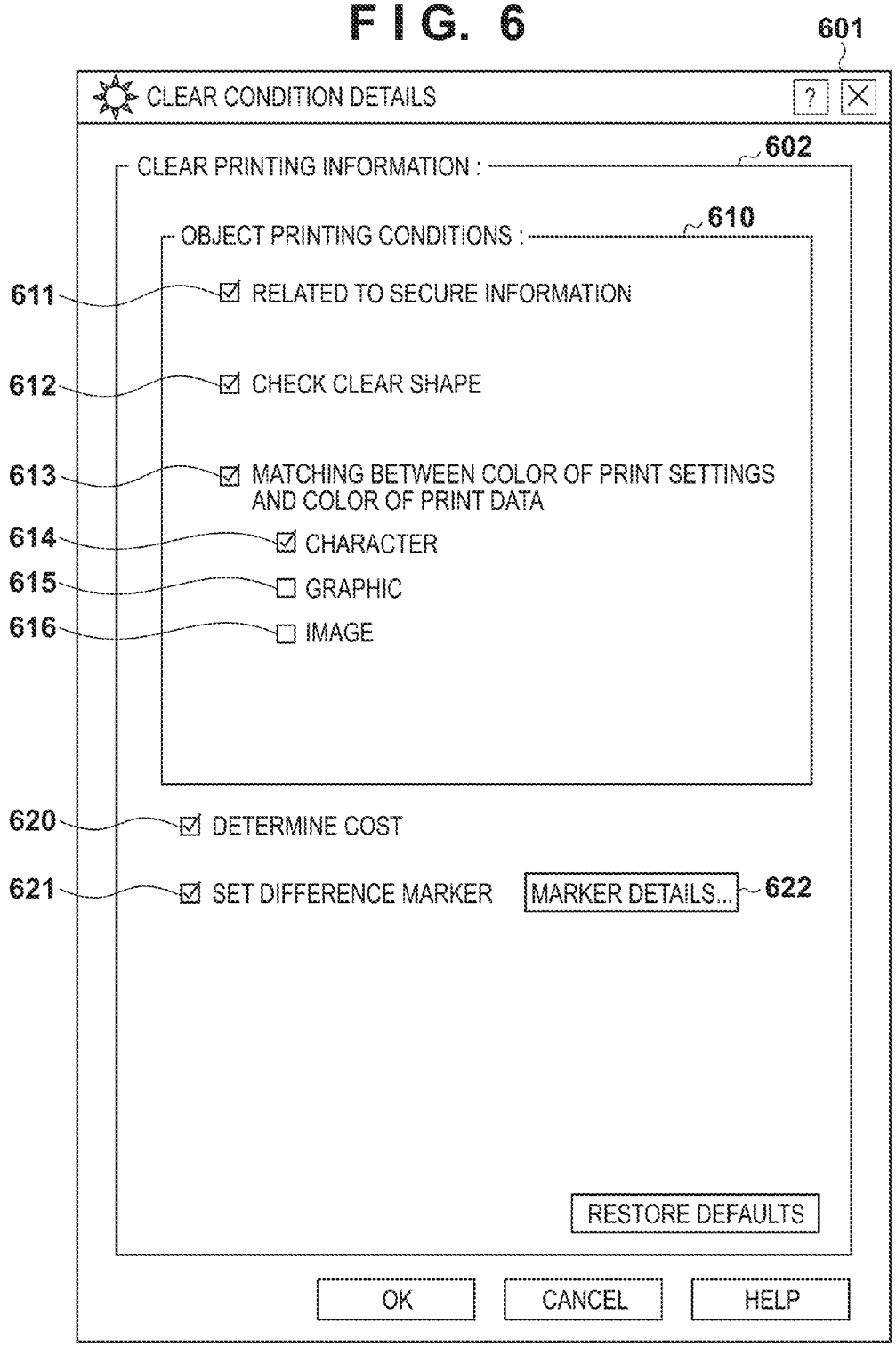
FIG. 6 is a view showing an example of a clear condition detail dialogue screen.

FIG. 6 is a view showing the screen displayed by pressing the clear condition detail button 516 shown in FIG. 5. When the "data-designated clear printing" is selected, advanced settings are done using this screen. This allows to impose a limit not to perform printing using the clear toner for an object for which the printing using the clear toner is set. When the limit is imposed, control is done not to issue a rendering command to print the object for which the limit is imposed not to perform the printing using the clear toner. On the other hand, control is done to issue a rendering command to print an object selected for the printing using the clear toner without imposing the limit.

Clear printing information 602 representing the clear printing information designated using the document data is displayed in a clear condition detail dialogue screen 601 shown in FIG. 6. The clear printing information includes an object printing condition region 610 to narrow the printing based on object printing conditions. Candidates of printing conditions to be set are displayed in the object printing condition region 610.

The object printing conditions selected from these candidates are switched using check boxes 611 to 616. Note that an object that satisfies at least one of the printing conditions and is therefore determined to be printed is printed.

When the user selects the check box 611 for "related to secure information", it is determined that the printing using the clear toner should be performed for a clear object (indicating an object printed using the clear toner) necessary for maintaining the secure level.

Figure 9:
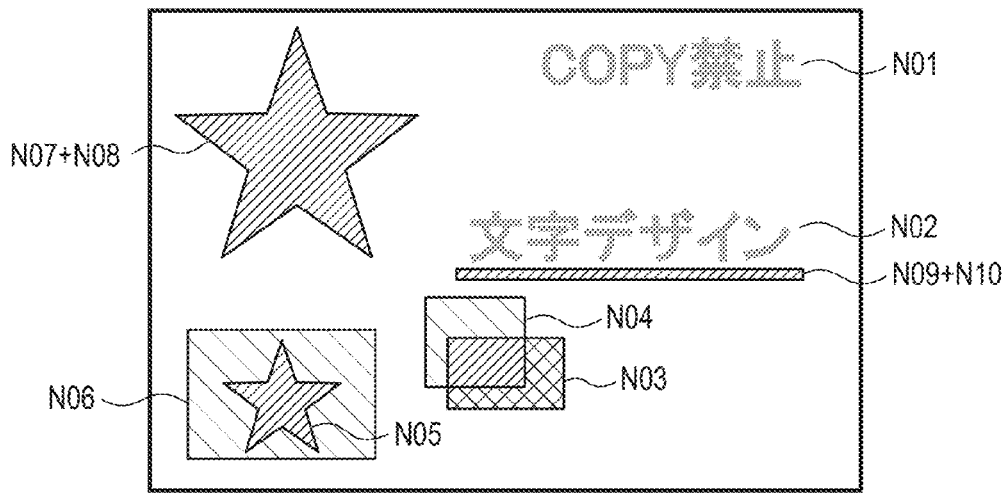
FIG. 9 is a view showing an example of document data.

In this case, the object to be printed using the clear toner is, for example, the NO1 object in FIG. 9 or secure characters (for example, copying prohibited) by the clear toner, and is important for maintaining the secure level of the document.

To determine the object for maintaining the secure level, a secure relation flag included in the information tag of the object is referred to determine its importance on security. Instead of using the information tag, the importance on security may be determined concerning a clear object added upon receiving a secure character printing instruction from a UI screen (not shown). This determination processing is done based on the setting information of the printer driver 202 for, for example, an added object whose print color is designated as a transparent color.

When the user selects the check box 612 to "check clear shape", it is determined that the printing using the clear toner is necessary not for the tint or texture of the design but for page composition check.

For example, the size and shape of a clear object are compared with those of a colored object overlapping the clear object. Upon determining that the size and shape are different, the clear object has not only the function of changing the tint or texture of the portion overlapping the colored object. It is determined that the shape of the clear object is important for checking the design composition, and the clear object needs to be printed. Note that the size and shape can be compared by, for example, determining whether the number of vertices of the clear object equals that of the colored object and confirming whether a unique corresponding vertex exists in a short range for each vertex. Alternatively, in a method of rasterizing objects while overwriting them from the lower layer to the upper layer, the ratio of pixels to be overwritten and the presence/absence of color data around the overwritten data may be determined at the time of rasterization of the clear object.

Figure 10:
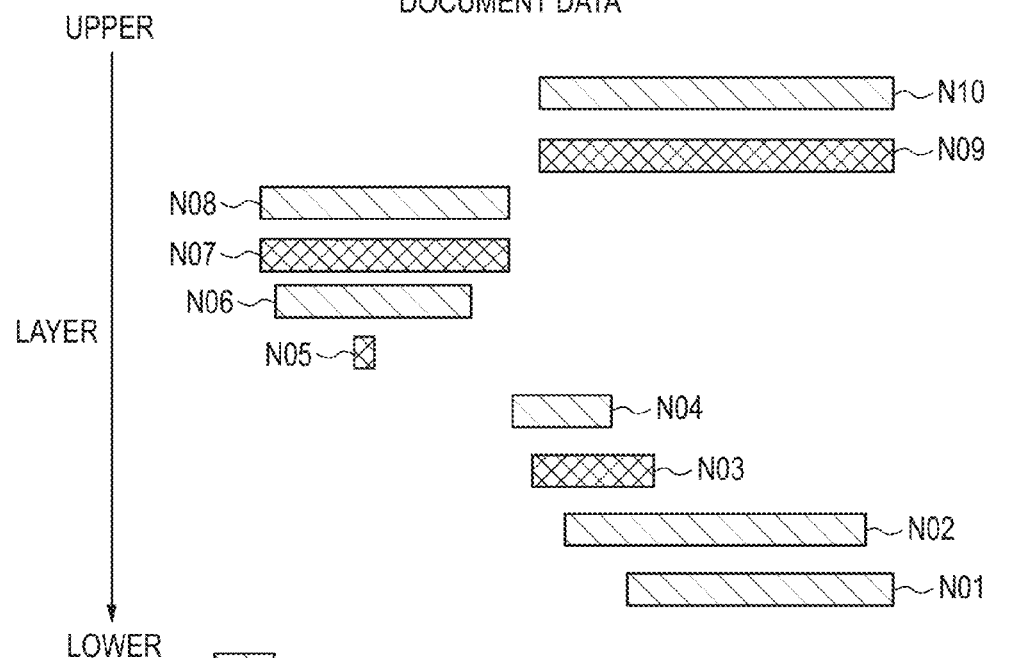
FIG. 10 is a view showing the layer structure of the document data shown in FIG. 9.

FIG. 9 illustrates an example of document data. FIG. 10 is a view showing the layer structure of the document data. As for NO9+NO10 objects in FIGS. 9 and 10, the shape of the clear object matches that of the colored object. It is therefore determined that shape check can be done without the clear object. As for NO2 object or NO6 object in FIG. 9, since no colored object having the same shape exists at the overlap portion, it is determined that the clear object needs to be printed.

Note that the above-described check box "check clear shape" may include a setting "exclude printing of a rectangular clear shape". When the user selects this setting, a rectangular clear object is not printed even if the shape of the colored object does not match that of the clear object. Unlike other shapes, clear printing of a rectangle is often used not for the design but to improve the durability by overcoat. In this case, the shape need not particularly be checked.

When the user selects the check box 613 for "matching between color of print settings and color of print data" in FIG. 6, the color mode of the print settings of the printer driver 202 is compared with the color information of the document data. The color mode includes a color mode and a monochrome mode. For example, when the document data has color information, and the monochrome mode is designated as the color mode, monochrome conversion processing is performed to output a printing result different from that designated by the document data. Even when the clear toner is applied in this state, the clear toner effect intended by the document data cannot be obtained. Hence, the printing using the clear toner need not particularly be performed. That is, it is determined that the printing using the clear toner needs to be done only when print processing in the same color mode as that of the document data is performed. Note that the clear toner printing condition may specifically be switched between characters, graphics, and image objects using the check boxes 614 to 616.

Figure 8:
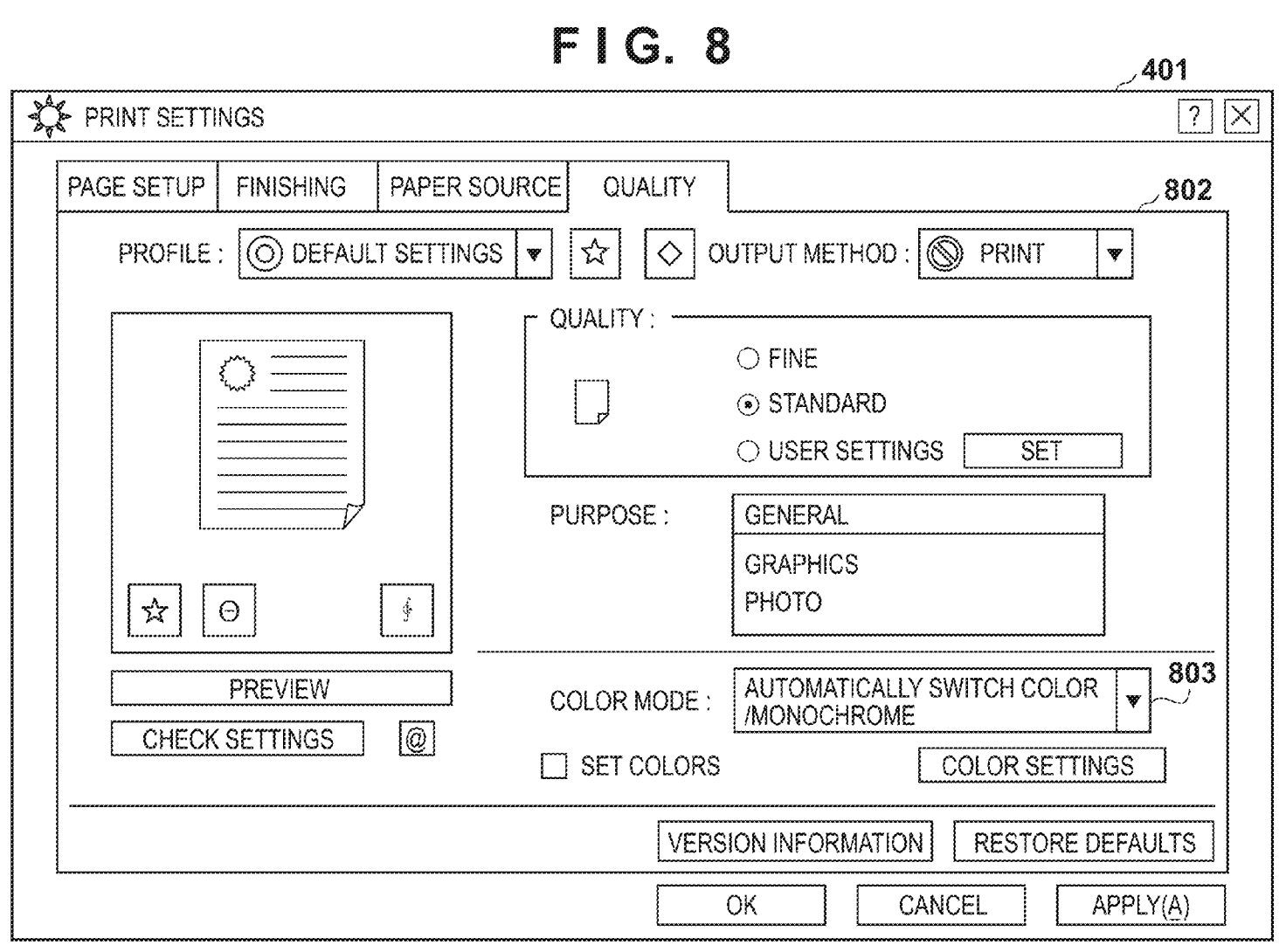

The color mode selected from a list box 803 shown in FIG. 8 is set. FIG. 8 illustrates a state in which a print quality sheet 802 that allows to do settings concerning print quality is displayed by selecting the quality tag in the print setting dialogue screen 401.

The above-described clear printing information in the clear condition detail dialogue screen 601 is also switched using the check boxes 620 and 621 in addition to the object printing conditions.

When the user selects the check box 620 to "determine cost", the clear charge that is the charge of the printing using the clear toner can be determined. This allows to perform clear toner printing in the maximum amount within a range of not changing the printing cost.

The clear printing target region is switched in accordance with the object printing conditions. The clear printing region may be extended within a range of not varying the clear charge. The extension manner changes depending on the clear charging method. For example, in a usage-based charging method that decides the clear charge based on the tone usage, the charge increase upon extending the clear printing region. For this reason, the check box 620 itself is not installed. In a print surface charging method, clear charging occurs when at least one clear object exists in the print surface. If at least one of the objects arranged in the print surface is subjected to clear printing, the charge does not change even when another clear object is printed.

Figure 11:
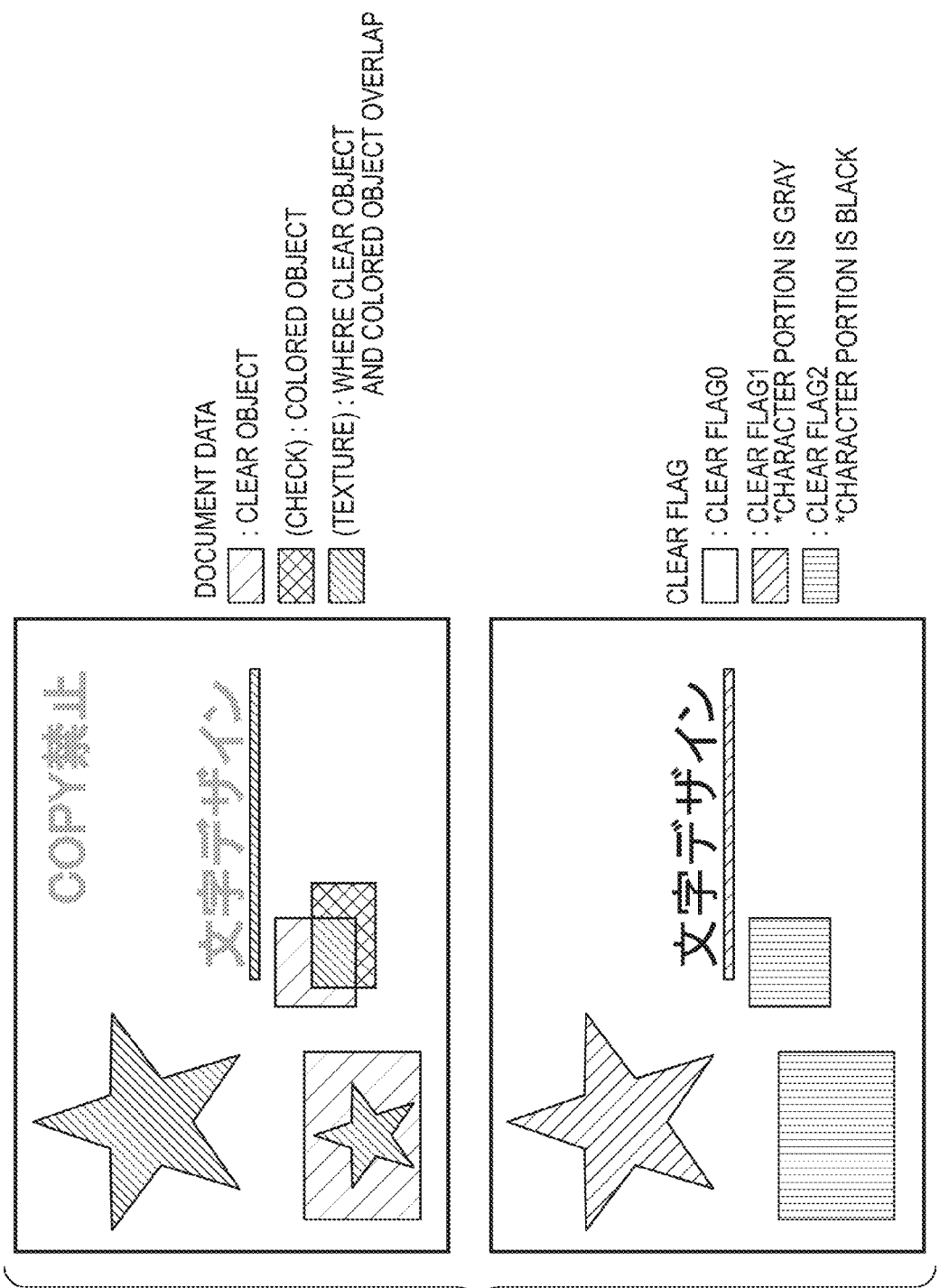
FIG. 11 is a view for explaining clear flags.
Figure 12:
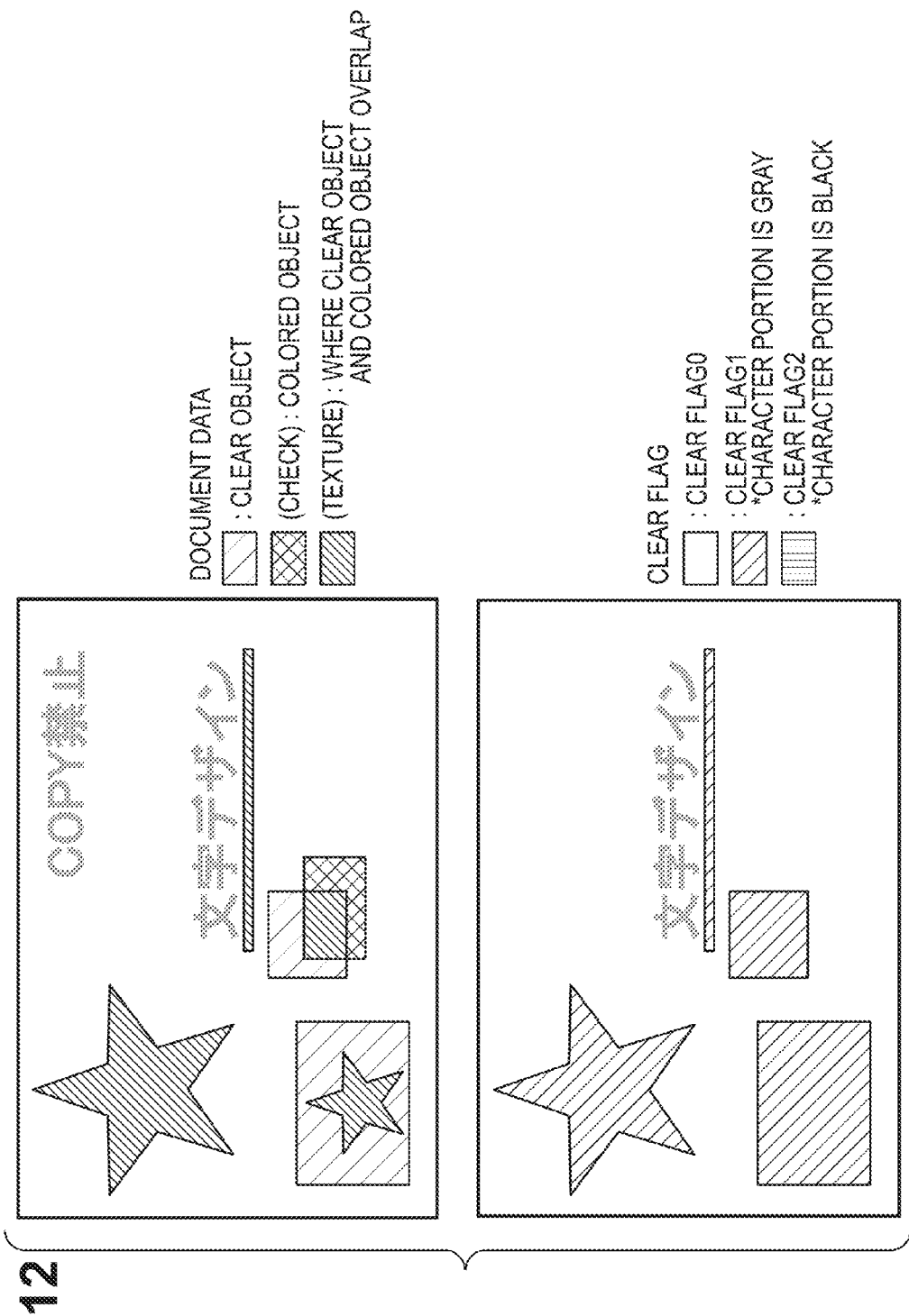
FIG. 12 is a view for explaining clear flags.

Hence, in the print surface charging method, the clear printing region is extended so as to print other clear objects in the same print surface as well. For example, assume that the clear flag of an object is set to 0 when the document data contains no clear data, 1 when the document data contains clear data but does not satisfy the printing condition, and 2 when the document data satisfies the printing condition. FIG. 11 is a view showing the states of clear flags in the document data. On the other hand, when cost determination is not performed, only portions with clear flag 2 are printed. When determining the cost in the print surface charging method, clear charging occurs for the print surface when at least one clear flag 2 exists in the print surface. Hence, the region is extended so as to print objects including clear flag 1 using the clear toner. If the clear flags of all objects in the print surface are 0 or 1, as shown in FIG. 12, there is no clear object that always needs to be printed. Hence, the objects with clear flag 1 are not printed using the clear toner.

Referring back to FIG. 6, when the user selects the check box 621 to "set difference marker", a marker is added using a colored toner if document data containing clear data is set not to be printed (printing is prohibited because of clear flag 1). A marker representing that clear output has been done in spite of the instruction of the document data is set on a page or a print surface where clear toner output contrary to the data has been performed. Advanced settings of the marker setting are done in the screen (FIG. 7) of the fourth layer displayed by pressing a marker detail button 622.

Figure 7:
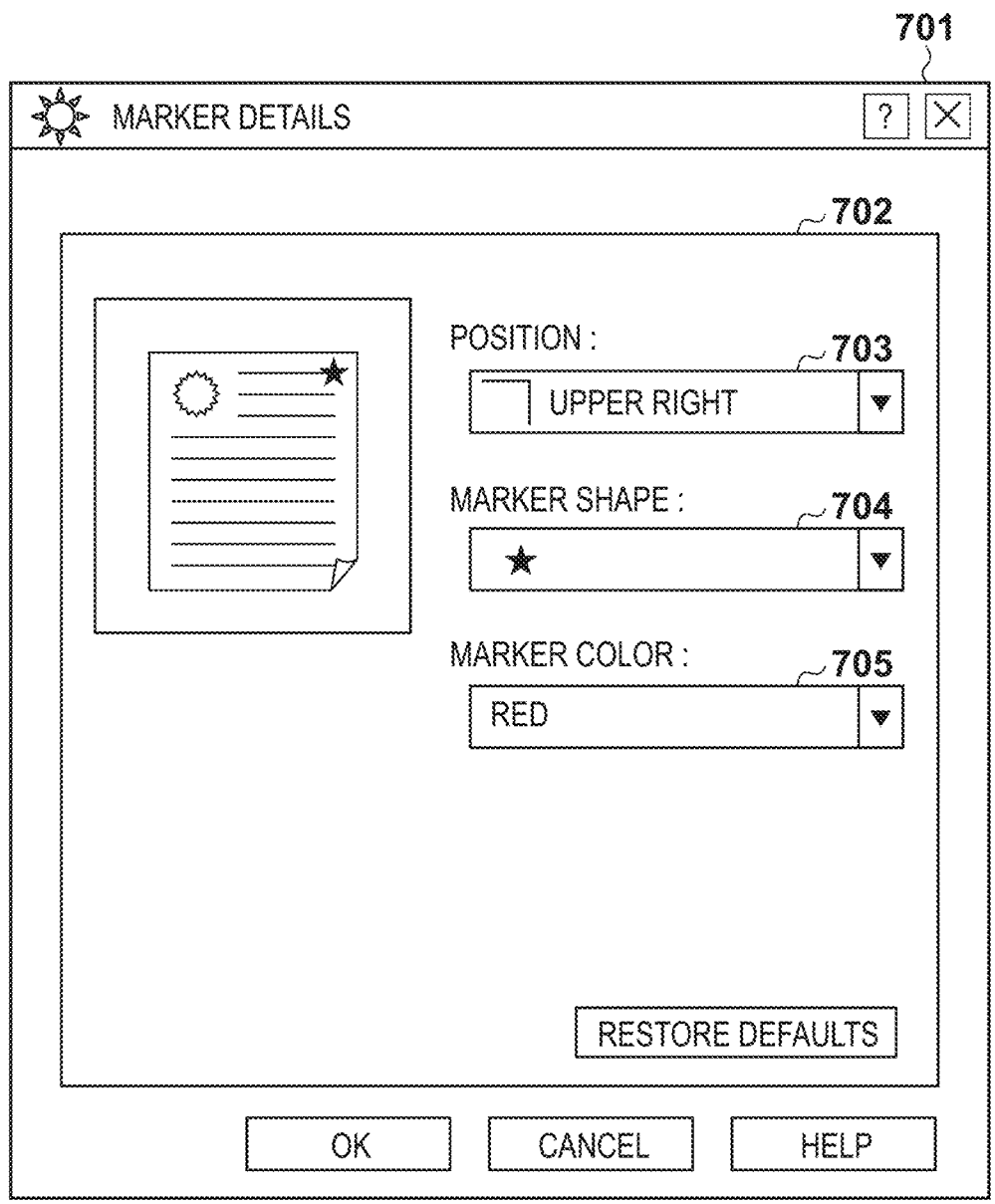
FIG. 7 is a view showing an example of a marker detail dialogue screen.

FIG. 7 is a view showing the screen displayed by pressing the marker detail button 622. A region 702 of a marker detail dialogue screen 701 includes a position 703 to designate marker setting, a marker shape 704 to designate the marker shape, and a marker color 705 to designate the marker color. Even when the marker color is set to a color, it may be printed monochromatically in accordance with the color mode setting in FIG. 8.

A print job for partial clear printing, which is created by the printer driver 202, will be described next with reference to FIGS. 13 and 14. FIGS. 13 and 14 are views showing PDL data as a print job created by the printer driver 202 and output to the printer 150. FIG. 13 is a view showing PDL data when the document data shown in FIGS. 9 and 10 is issued as a clear toner print job as designated by the data. The job is sandwiched between two commands <Begin Job> and <End Job>. <Begin Page> and <End Page> indicate the start and end of a page, and the rendering commands of the objects in the page are stored between them. Since all rendering objects are sandwiched between <Begin Page> and <End Page>, they are output as rendering data in the single page.

In addition, commands <Begin ClearToner ON> and <End ClearToner ON> are included between <Begin Page> and <End Page>. [Rendering Object N01], [Rendering Object N02], . . . , [Rendering Object N08], and [Rendering Object N10] sandwiched between <Begin ClearToner ON> and <End ClearToner ON> are printed using the clear toner. Other [Rendering Object Nxx] sandwiched between <Begin Page> and <End Page> are printed using the CMYK toners.

In FIG. 14, commands <Begin ClearToner OFF> and <End ClearToner OFF> are included between <Begin Page> and <End Page>. Objects that are clear objects not to be clear-printed because of the conditional printing setting shown in FIG. 5 are sandwiched between these commands. If the printer 150 that receives the PDL data does not need the information of the objects not to be clear-printed, the PDL data between the commands may be deleted.

In FIGS. 13 and 14, the commands are divided by ClearToner ON/OFF. However, the commands may be divided by the clear flags shown in FIG. 12. Note that the commands are divided by the clear flags if which clear flag designates printing is unknown at the timing the printer driver 202 has created the PDL data.

As described above, the printer driver 202 includes the rendering instruction by the color toners and the rendering instruction by the clear toner in one print instruction (print job) for the printer 150. This makes it possible to instruct the printer 150 to perform printing using the clear toner on the same surface of the same paper sheet on which printing using the color toners has been done. Document data including one page has been exemplified above for the descriptive convenience. However, when the document data includes a plurality of pages, the same processing as described above is performed on the page basis.

Figure 15:
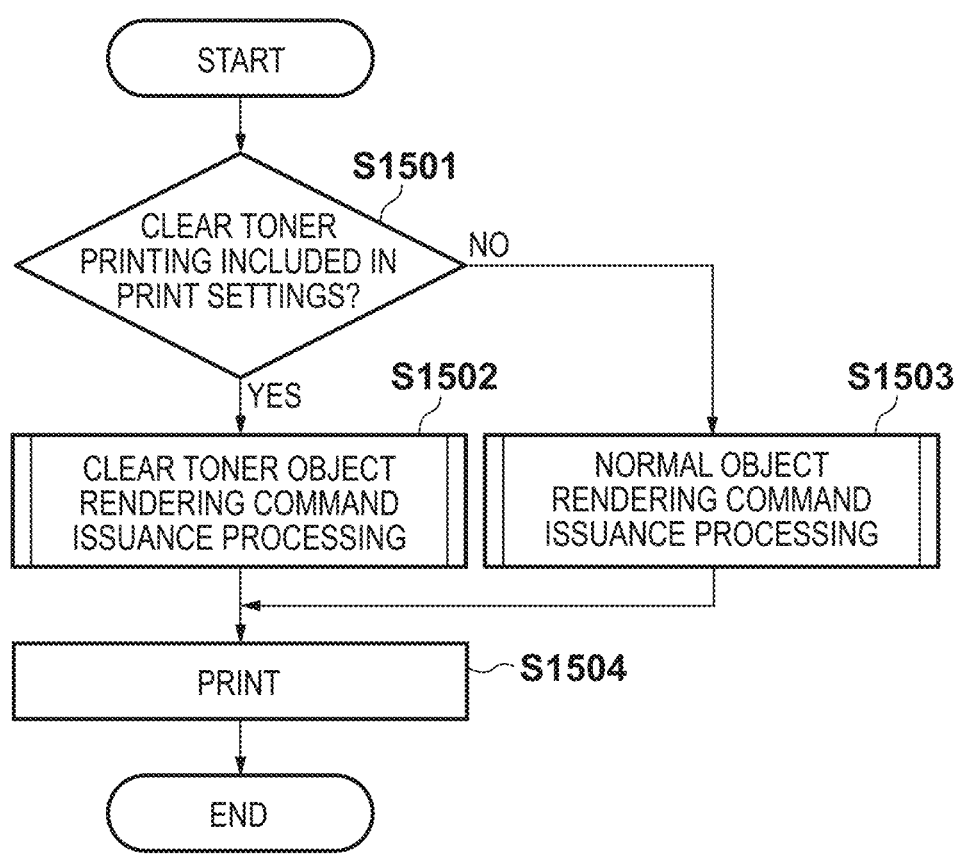
FIG. 15 is a flowchart showing print job creation processing.
Figure 16:
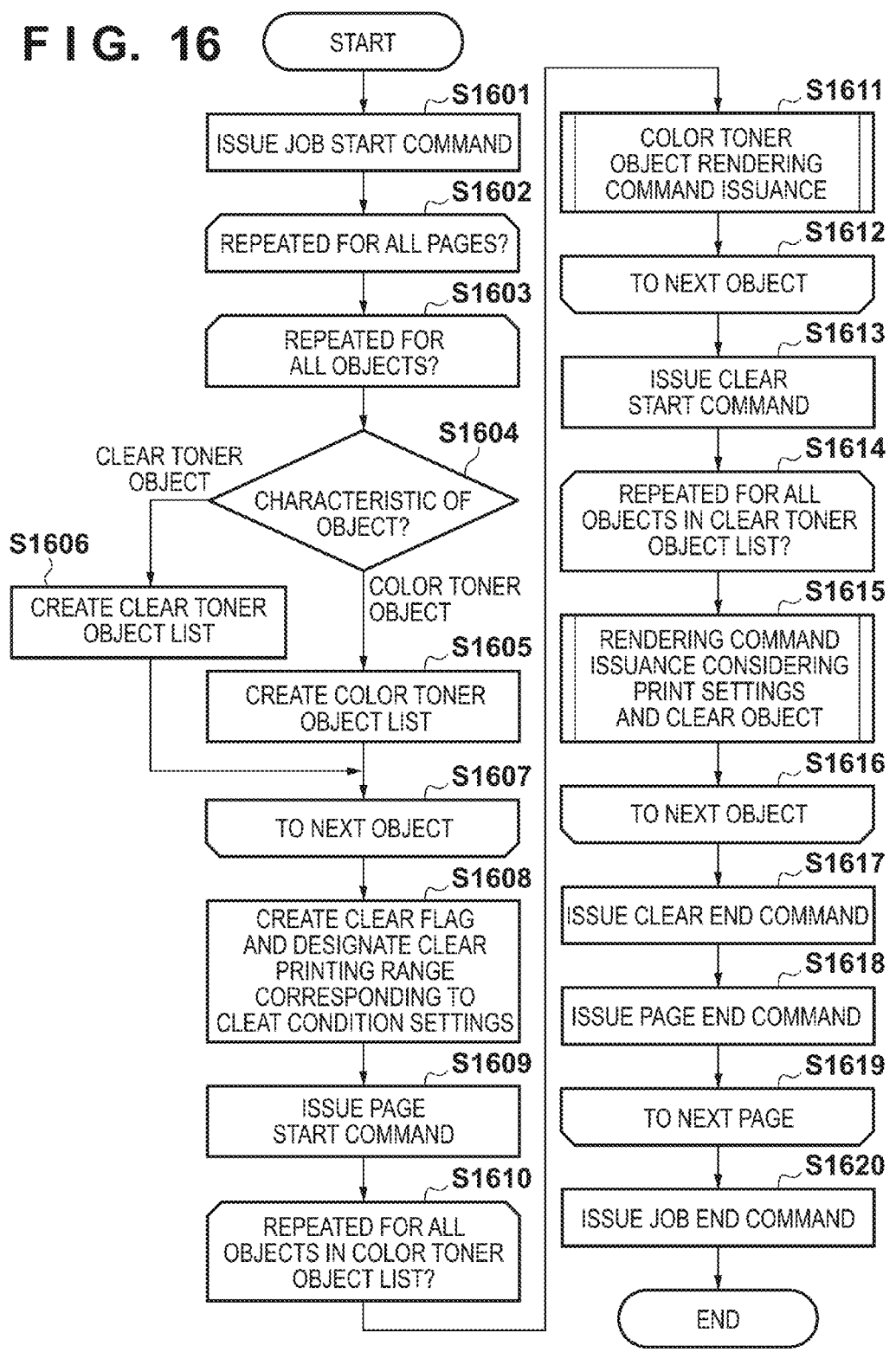
FIG. 16 is a flowchart showing print job creation processing.
Figure 17:
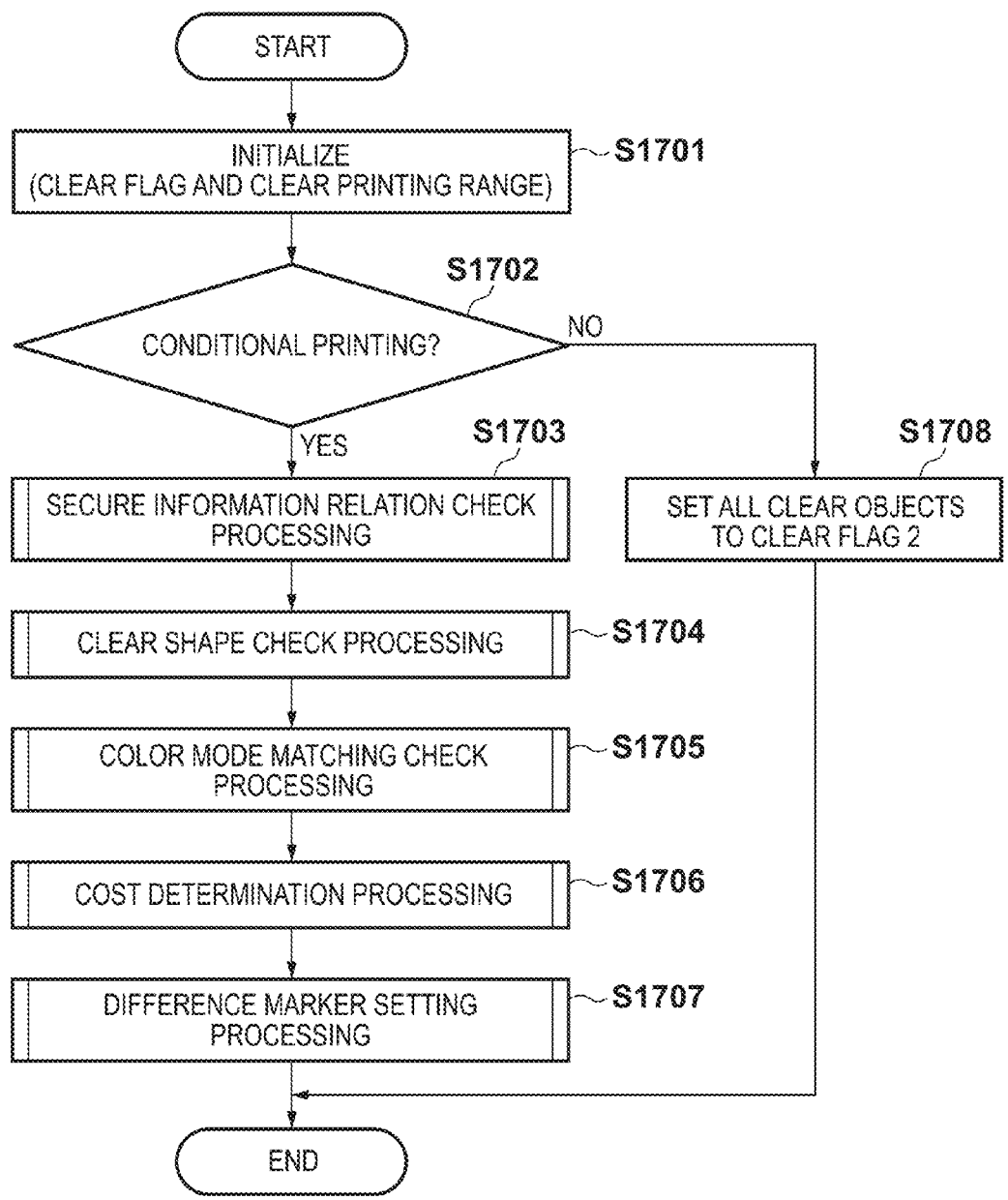
FIG. 17 is a flowchart showing print job creation processing.

Processing of causing the printer driver 202 to create the print job (PDL data) will be described next in detail with reference to FIGS. 15 to 17. FIGS. 15 to 17 are flowcharts showing the print job creation process in the printer driver 202. Note that the function of the printer driver 202 shown in the flowcharts is implemented by causing the CPU 101 to load a printer driver program to the RAM 102 and execute it.

In step S1501 of FIG. 15, the printer driver 202 confirms the contents of print settings. More specifically, the printer driver 202 confirms which one of "not print", "full clear printing", and "data-designated clear printing" is selected as the clear toner processing method in the page option dialogue screen 501 shown in FIG. 5. Upon determining as the result of confirmation that "full clear printing" or "data-designated clear printing" is selected, the process advances to step S1502. When "not print" is selected, the process advances to step S1503.

In step S1502, the printer driver 202 performs object rendering command issuance processing for the clear toner to do printing using the clear toner. This will be described later in detail with reference to FIG. 16. On the other hand, in step S1503, the printer driver 202 performs normal object rendering command issuance processing not to perform printing using the clear toner at all. The outline will be described below.

First, a command to render all objects in the document page as objects in the designated colors is issued. Referring to FIG. 13, a print job without <Begin ClearToner ON> and <End ClearToner ON> between <Begin Page> and <End Page> is generated. When "full clear printing" is selected, the process advances to step S1502. However, instead of adding the rendering command for full clear printing to the print job itself, the rendering command for full clear printing may be sent to the printer independently of the print job. In that case, the process advances to step S1503 to generate the print job.

Referring back to FIG. 15, the printer 150 performs printing based on the received print job in step S1504.

Detailed processing of step S1502 will be described next with reference to FIG. 16. In step S1601, the printer driver 202 issues the job start command <Begin Job>. Next, the printer driver 202 repeats steps S1602 to S1619 until all unprocessed pages are gone. Then, the printer driver 202 repeats steps S1603 to S1607 until all unprocessed objects are gone. In step S1604, the printer driver 202 determines, based on the document data and the setting information of data-designated clear printing shown in FIG. 5 or the like, whether an object is a color object to be printed using the CMYK color toners or a clear toner object to be printed using the clear toner. Upon determining that the object is a color toner object, the process advances to step S1605. Upon determining that the object is a clear toner object, the process advances to step S1606. If the object has both characteristics, both steps S1605 and S1606 are performed.

In step S1605, the printer driver 202 adds the object determined as a color toner object to a color toner object list. The list can be of any type as far as its structure allows to refer to the process target object later. On the other hand, in step S1606, the printer driver 202 adds the object determined as a clear toner object to a clear toner object list. The list can be of any type as far as its structure allows to refer to the process target object later.

Next, in step S1608, the printer driver 202 performs the following processing for all objects that exist in the clear toner object created in step S1606. When a checkmark is placed in the check box 515 of conditional printing, the clear flags are generated in accordance with the clear condition settings designated in FIG. 6. In addition, the clear printing range representing the range of the clear flag to be subjected to printing is designated. For example, the clear flag is generated for each clear object as shown in FIG. 11 or 12. Normally, clear flag 2 is designated as the clear printing range. Note that if no checkmark is placed in the check box 515 of conditional printing, clear flag 2 is set as the clear printing range, and all clear objects are generated with clear flag 2. The processing of step S1608 will be described in more detail with reference to FIG. 17.

In step S1609, the printer driver 202 issues the page start command <Begin Page>. The printer driver 202 then repeats steps S1610 to S1612 until all objects that exist in the color toner object list created in step S1605 have been processed. In step S1611, the printer driver 202 converts the color toner objects into PDL and issues rendering commands [Rendering Object xxx] that are not sandwiched between the commands <xx ClearToner xx> in FIG. 13 or 14.

In step S1613, the printer driver 202 issues the clear start command <Begin ClearToner ON>, thereby declaring that the object rendering commands from then on instruct printing using the clear toner. The printer driver 202 then repeats steps S1614 to S1616 until all objects that exist in the clear toner object list created in step S1606 have been processed. In step S1615, the printer driver 202 performs processing of converting the clear objects into PDL based on the setting information of the clear toner processing method in FIG. 5 and the clear flags and the clear printing range generated in step S1608, and issues object rendering commands. Processing of converting a clear object having the clear flag that designates clear printing into PDL is performed to issue a rendering command. That is, the commands are issued as in the spool file shown in FIG. 13.

When issuing the rendering command of a clear object, the color informant of the object becomes meaningless. Hence, the clear object is set to a predetermined density (for example, 100%). Note that if the object has some attribute (for example, the α composite attribute to translucently display the object) added by the user for the sake of appearance on the application, the attribute is neglected (removed). Alternatively, for example, assuming that the density is expressed by the α composite attribute, the attribute may be converted into density information based on the α value (converted into the applied amount of the clear toner).

When the object rendering command issuance has ended, the process advances to step S1617. Although not illustrated, the rendering command may be issued even for a clear object that does not satisfy the clear printing conditions and is not to be printed, as shown in FIG. 14. In this case, the commands <Begin ClearToner OFF> and <End ClearToner OFF> are issued to sandwich the rendering commands of the clear objects between them.

In step S1617, the printer driver 202 issues the clear end command <End ClearToner ON>. In step S1618, the printer driver 202 issues the page end command <End Page> because all the color toner rendering data and clear toner rendering data in the process target page have been converted into the commands. In step S1620, the printer driver 202 issues the job end command <End Job>.

Details of the processing of step S1608 will be described with reference to FIG. 17. In step S1701, the printer driver 202 initializes the clear flags of all clear objects and assigns clear flag 0. The printer driver 202 also initializes the clear printing range and sets clear flag 2 to the clear printing range. That is, only the clear objects having clear flag 2 undergo the clear printing. Note that the present invention is not limited to this example, and the user may designate the flag of the clear object to be subjected to the clear printing. For example, the designation may be done such that clear objects having clear flags other than clear flag 0 are subjected to the clear printing.

In step S1702, the printer driver 202 determines whether conditional printing is selected. More specifically, the printer driver 202 confirms the check box 515 of conditional printing in FIG. 5. If the conditional printing is off, the process advances to step S1708. If the conditional printing is on, the process advances to step S1703. In step S1703, when the check box 611 for "related to secure information" is selected, the printer driver 202 determines whether a clear object is related to secure information. If the clear object is related to secure information, the printer driver 202 sets the clear flag to 2. Otherwise, the clear flag is set to 1. In step S1704, when the check box 612 to "check clear shape" is selected, the printer driver 202 determines whether a clear object has a size and shape that do not match those of a color object. If clear object printing is necessary for shape check, the printer driver 202 sets the clear flag to 2. Otherwise, the clear flag is set to 1.

In step S1705, when the check box 613 for "matching between color of print settings and color of print data" is selected, the printer driver 202 performs the following processing. In step S1705, the printer driver 202 compares the color mode information of the page including a process target object with the color information of a color object. If the colors match as the result of comparison, the printer driver 202 determines that it is possible to check the clear effect intended upon creating the document data, and sets the clear flag of the clear object to 2. Otherwise, for example, if monochrome printing is set in the print settings, although color printing is set for the color object in the document data, the clear flag is set to 1. Note that the above-described comparison is done only for objects that match the object set by the check boxes 614 to 616.

In step S1706, if the check box 620 to "determine cost" is selected, the printer driver 202 reviews all clear flags in accordance with the clear charging method of the print model, and resets the clear printing range. Assume that clear toner charging occurs on the page basis, and the clear printing range is reset on the page basis. For example, when the clear flags shown in FIG. 11 are generated based on various printing conditions, and the clear printing range remains in the initial state, each region of clear flag 1 is not printed although it is clear data in the document data. In the page-based clear charging method, however, clear printing is definitely performed for the page shown in FIG. 11 because of the presence of clear flag 2. Hence, omitting clear printing for clear flag 1 is unnecessary in terms of cost.

When the check box 620 to "determine cost" is selected, the rendering commands of the clear objects are issued while making the clear printing region include both clear flag 1 and clear flag 2. That is, the clear printing range is changed to 1 or more. Note that in the print surface charging method, the clear printing range is reset on the print surface basis based on the clear flags of objects in the whole page included in the same print surface.

In step S1707, when the check box 621 to "set difference marker" is selected, the printer driver 202 determines based on the clear flags and the clear printing range information whether a clear object not to be printed exists in the page. Upon determining that a clear object not to be printed exists, the printer driver 202 sets a marker in accordance with the settings in the marker detail dialogue screen 701. Although the marker setting position is not illustrated, the settings may be done to set a marker not only for each page but also for each print surface.

On the other hand, upon determining in step S1702 described above that the conditional printing is off, the printer driver 202 sets clear flag 2 for all clear objects in step S1708.

With the above-described procedure, the printer driver 202 creates the print job (PDL data) shown in FIG. 13 or 14. Note that the commands used in the explanation are merely examples and can freely be changed in correspondence with the system. In the processing shown in FIG. 16, the color objects and the clear toner objects are temporarily listed. Then, after the rendering commands for the objects using the color toners are issued, the rendering commands for the clear toner objects are issued at once.

However, the present invention is not limited to this, and various changes and modifications can be made. For example, instead of listing the objects, the rendering commands of the objects of both types may be issued without discrimination, and the attribute of each rendering command may be inserted to an appropriate portion. In addition, although the processing shown in FIG. 16 is performed for each page, the processing may be done for each print surface. In, for example, 2-IN-1 print settings, the processing can be performed for a print surface in which two pages are to be printed. The above description specializes in a clear toner. However, the present invention is applicable not only to a clear toner but also to any other spot color printing material having the same application purpose as that of the clear toner.

According to the first embodiment, it is possible to instruct a printer to flexibly switch the presence/absence of printing using a clear toner in a region for which the printing using the clear toner is designated in document data created by a general application.

Second Embodiment

The first embodiment is configured to generate a print job (PDL data) including the rendering commands of objects to be printed using a spot color printing material (clear toner) on the side of the printer driver 202 of the host computer 100.

In the second embodiment, processing of causing a printer 150 to generate an image data version using normal color toners and an image data version using a spot color printing material at the time of PDL data rendering. Note that only the differences from the first embodiment will be described.

Figure 18:
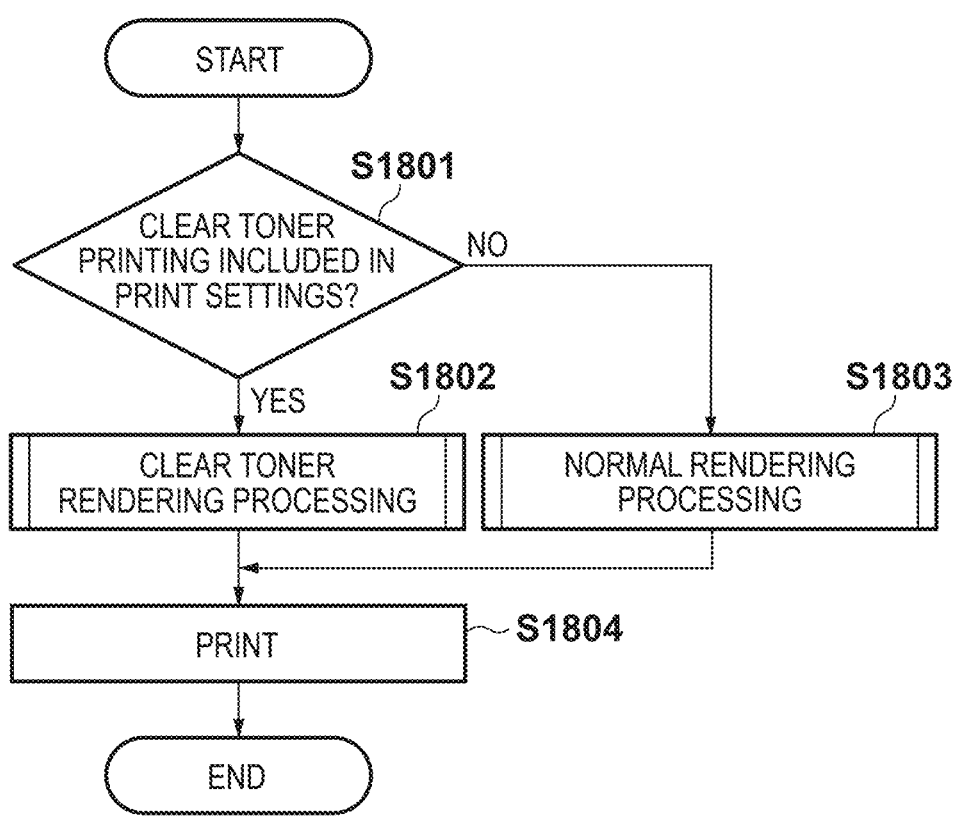
FIG. 18 is a flowchart showing print job creation processing.
Figure 19:
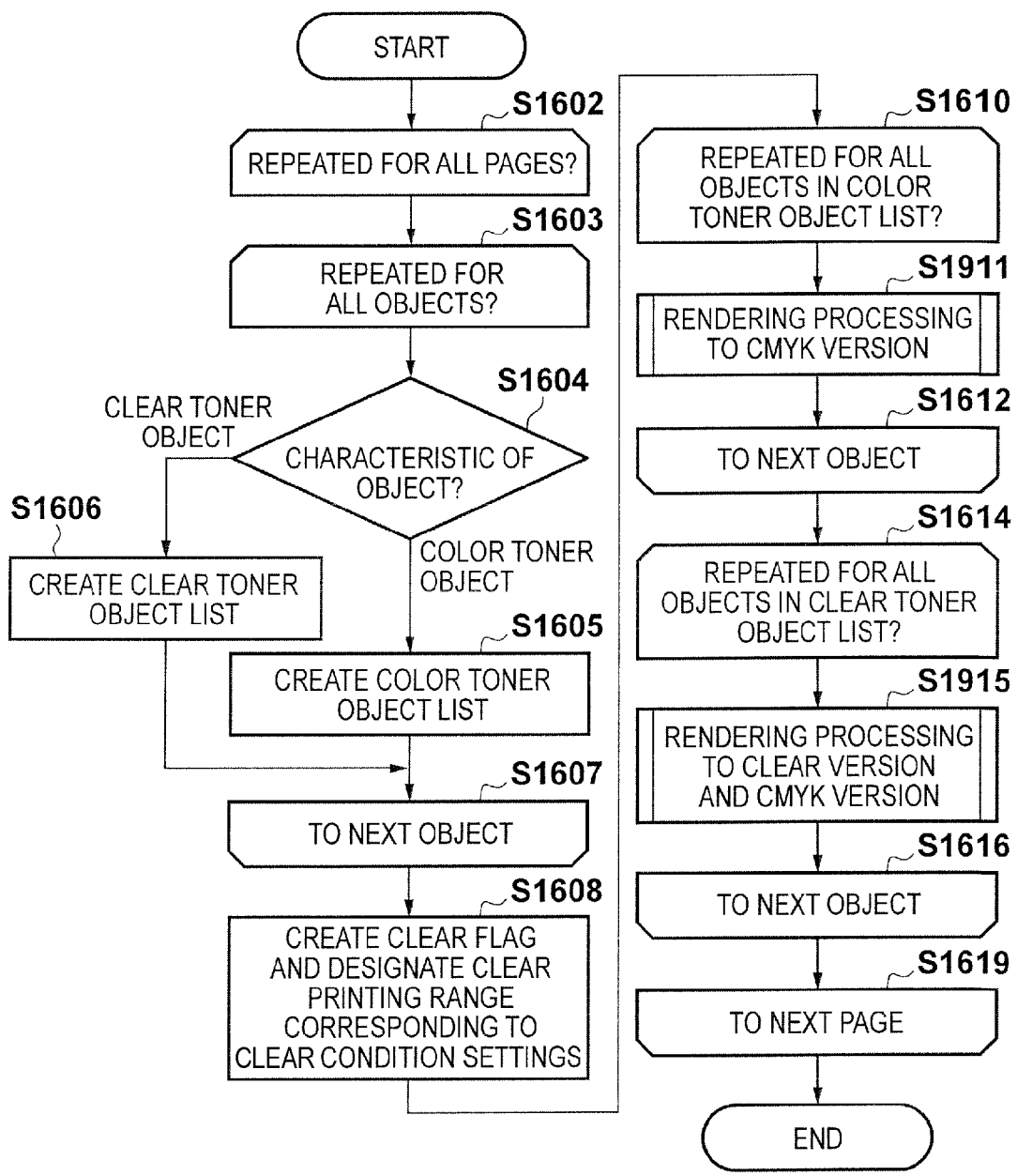
FIG. 19 is a flowchart showing rendering processing of a printer 150.

FIGS. 18 and 19 are flowcharts showing rendering processing in the printer 150 according to the second embodiment. Note that the processing shown in the flowcharts is implemented by causing a CPU 151 of the printer 150 to load a PDL data processing program stored in a ROM 153 or an external memory 160 to a RAM 152 and execute it. All contents designated by the user on the user interface of a printer driver 202 are included in the PDL data, and the CPU 151 can freely refer to them.

Upon receiving PDL data from a host computer 100, the CPU 151 of the printer 150 determines in step S1801 by referring to the PDL data whether the print settings include clear toner printing. More specifically, the CPU 151 determines from the PDL data which one of the radio buttons "not print", "full clear printing", and "data-designated clear printing" is selected in a clear toner processing method region 510 of a page option dialogue screen 501 shown in FIG. 5. Upon determining that "full clear printing" or "data-designated clear printing" is selected, the process advances to step S1802. If "not print" is selected, the process advances to step S1803. In step S1802, the CPU 151 performs clear toner rendering processing to perform printing using the clear toner. Details of this processing will be described later with reference to FIG. 19.

On the other hand, in step S1803, the CPU 151 performs normal rendering processing not to perform printing using the clear toner at all. In this processing, the CPU 151 renders all objects in the image data area for CMYK color toner version in the RAM 152.

When each rendering processing described above has ended, in step S1804, the CPU 151 outputs the rendered image data to a printing unit (printer engine) 158 as an image signal so that the printing unit 158 prints based on the received image data.

Detailed processing of step S1802 will be described here with reference to FIG. 19. Note that this processing is different from the processing shown in FIG. 16 of the first embodiment in that not the printer driver 202 but the printer 150 executes it. In addition, since the printer 150 receives PDL data from the host computer 100, there is no processing concerning command generation.

As another difference, in step S1911, the CPU 151 performs rendering in the image data area for the CMYK color toner version in the RAM 152 instead of issuing rendering commands. Additionally, in step S1915, the CPU 151 performs rendering in the image data area for the clear toner version and the clear flag version in the RAM 152 instead of issuing rendering commands. Unlike the first embodiment, the clear flag is set not for each object but for each pixel, thereby switching the presence/absence of clear printing.

Note that the above-described rendering processing is merely an example and can freely be changed in correspondence with the system. In the processing shown in FIG. 19, the color objects and the clear toner objects are temporarily listed. Then, after the color rendering processing is performed, the clear rendering processing is performed. However, various changes and modifications can be made for this point. For example, instead of listing the objects, they may directly be rendered. In addition, although the rendering processing shown in FIG. 19 is performed for each page, the rendering processing may be done for each print surface. Although the presence/absence of clear printing is controlled by generating a clear flag version, the presence/absence of clear printing may directly be reflected on the clear version without generating the clear flag version. The above description specializes in a clear toner. However, the present invention is applicable not only to a clear toner but also to any other spot color printing material having the same application purpose as that of the clear toner.

According to the second embodiment, it is possible to cause a printer to print while flexibly switching the presence/absence of printing for PDL data for clear toner printing designated using document data.

Third Embodiment

In the first and second embodiments, the presence/absence of printing of each clear object is flexibly switched in accordance with conditions. In the third embodiment, an example will be explained in which the printing region of each clear object is flexibly extended in accordance with conditions. Note that only the differences from the first and second embodiments will be described.

FIGS. 22A to 23C are views for explaining a state in which printing misregistration between a color object and a clear object becomes more conspicuous upon reduction printing. Note that in general, since the misregistration in the sub-scanning direction is large, a description specializing in the misregistration in the sub-scanning direction will be made below.

Figure 22A:
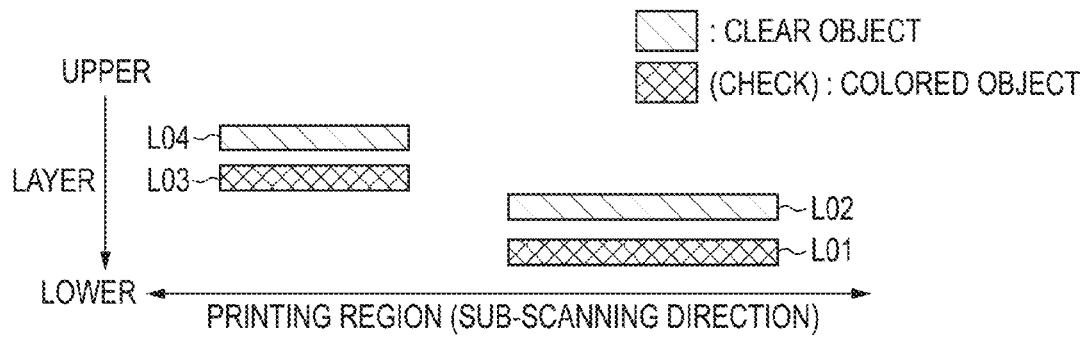
FIGS. 22A to 22C are views for explaining printing misregistration in reduction printing.
Figure 22B:
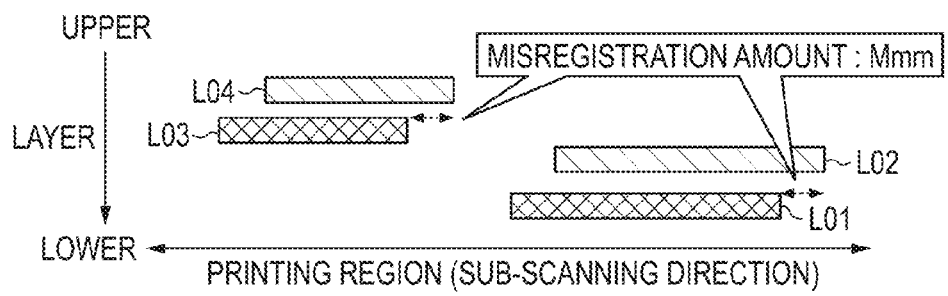
Figure 22C:
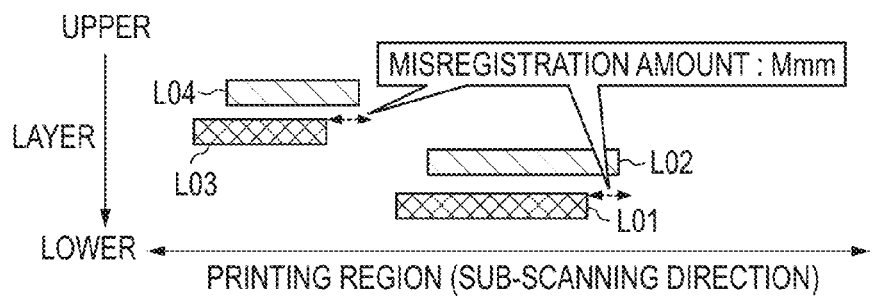
Figure 23A:
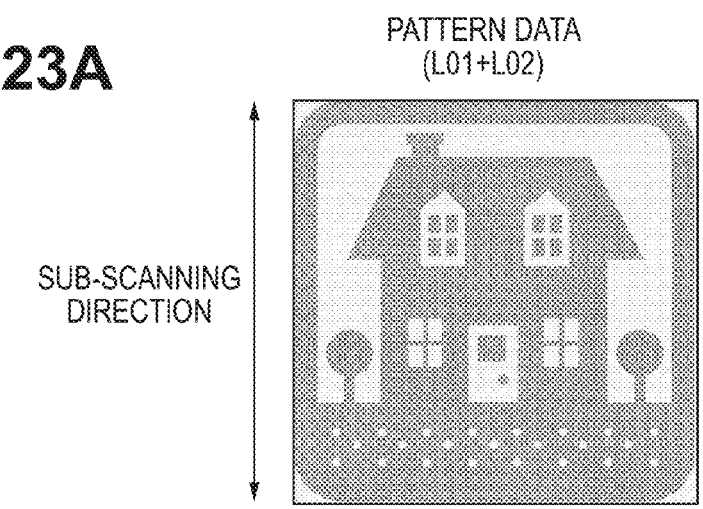
FIGS. 23A to 23C are views for explaining printing misregistration in reduction printing.
Figure 23B:
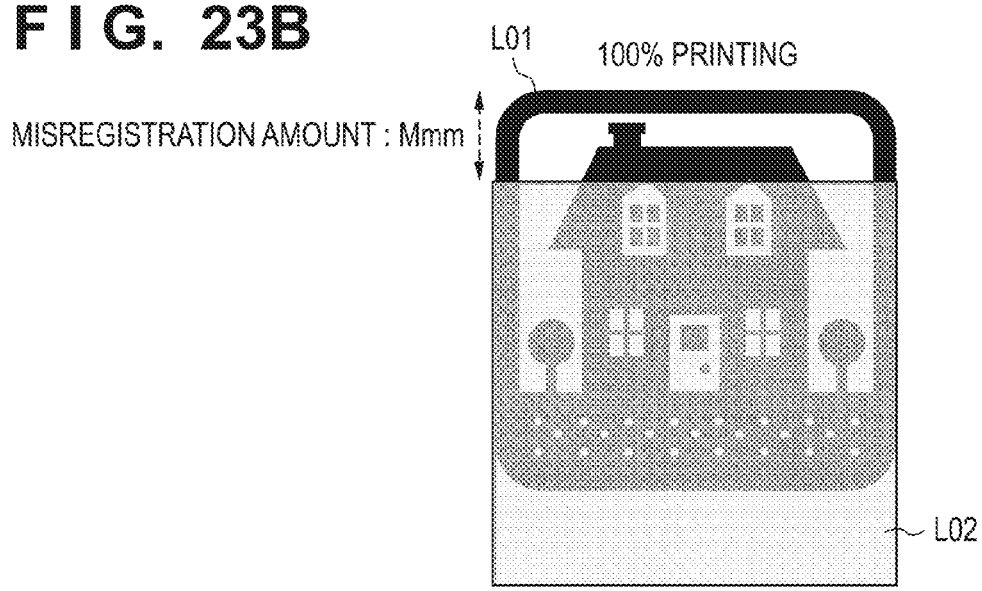
Figure 23C:
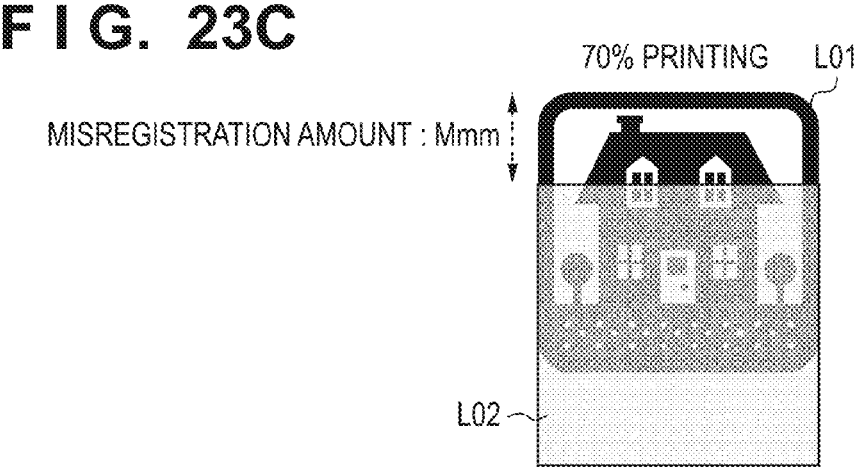

FIG. 22A shows the layer structure of document data. In L01 and L02, and L03 and L04, the clear objects are designed so as to completely overlap the color objects. In actual printing, however, misregistration may occur between the color toners and the clear toner, as in FIG. 22B or FIG. 22C. Note that the misregistration amount is independent of the output size of the document data, as shown in FIG. 22B in which the document data is output at 100% or FIG. 22C in which the document data is output at 70%.

The misregistration amount is independent of the output size of the document data. In reduction printing, the misregistration amount relative to the pattern increases because the pattern is reduced, as can be seen by comparing FIG. 23B and FIG. 23C.

In the third embodiment, the printing range of a clear object is extended in accordance with conditions. Extending the printing range of a clear object allows to apparently reduce the amount of misregistration relative to the pattern.

FIG. 20 is a view showing a screen obtained by adding a check box 2017 for "extension printing" and a clear extension detail button 2018 to a screen 501 shown in FIG. 5. When extension printing is set, extension processing is executed for each clear object. Advanced settings of the extension printing are done in the screen of the third layer displayed by pressing the clear extension detail button 2018.

Figure 21:
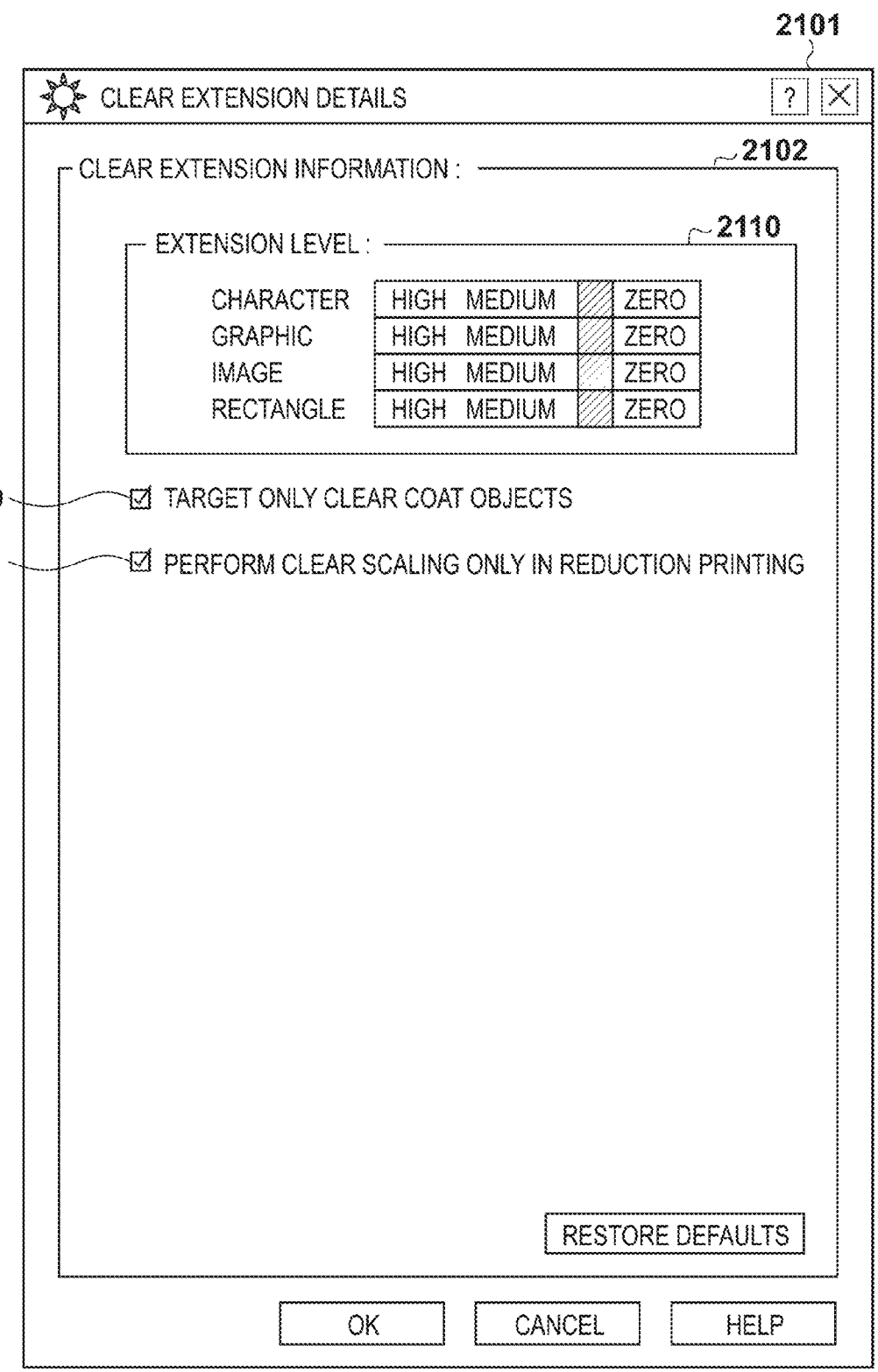
FIG. 21 is a view showing an example of a clear extension detail dialogue screen.

FIG. 21 is a view showing the screen displayed by pressing the clear extension detail button 2018. A clear extension detail dialogue screen 2101 shown in FIG. 21 includes a clear extension information region 2102 to designate part of document data to be extended and the level of extension. The clear extension information region 2102 includes an extension level region 2110 to adjust the extension level of each object. In this region, the extension amount can be set in four levels for each of character, graphic, image, and rectangular objects.

Note that although the rectangular shape that is designated for the purpose of clear coat in many cases can independently be designated, this shape designation is not always necessary. In addition, any number of levels can be set for the extension amount. A graphic, image, or rectangular object is extended in size without moving the center point. A character object is extended not in character size but by thickening the lines of the character. The extension method is not limited to this. Even if a color object overlapping a clear object has misregistration, the extension processing is executed in the direction to overcoat the color object.

The clear extension information region 2102 of the clear extension detail dialogue screen 2101 also includes check boxes 2120 and 2121 in addition to the extension level region 2110. When the user selects the check box 2120 to "target only clear coat objects", it is determined whether a clear object serves as the clear coat of a color object. The extension processing is performed only for clear objects determined to aim at clear coat. If objects including a clear object that does not aim at clear coat are extended, the balance of design composition to the color objects is lost. To prevent this, only objects for cleat coat can undergo the extension processing.

Note that the above-described determining whether a clear object is an object for clear coat is done by, for example, comparing the size and shape of a colored object at a position to overlap a clear object. If the colored object having almost coincident size and shape exists, the clear object is determined to be an object for clear coat. Even when there exists only a color object included in the clear object, it is determined to be an object for clear coat.

When the user selects the check box 2121 to "perform clear scaling only in reduction printing", extension processing of a clear object is performed only when reduction printing of document data is set in the print settings. This allows to extend clear printing only in reduction printing because the amount of misregistration relative to the pattern is particularly problematic at the time of reduction, as described with reference to FIGS. 22A to 23C.

The clear extension processing will be described next. The processing is basically the same as in FIG. 16 or 19. The processing is different from FIG. 16 in that in step S1608, a printer driver 202 creates an extension flag using the setting information in the clear extension information region 2102 in addition to the clear flags. Additionally, in step S1615, the printer driver 202 issues each clear rendering command in the extension size using the extension flag created in step S1608 and the information in the extension level region 2110. The processing is different from FIG. 19 in that in step S1608, a CPU 151 creates an extension flag using the setting information in the clear extension information region 2102 in addition to the clear flags. Additionally, in step S1915, the CPU 151 performs rendering processing of the clear version and the clear flag version in the extension size using the extension flag created in step S1608 and the information in the extension level region 2110.

Figure 4:
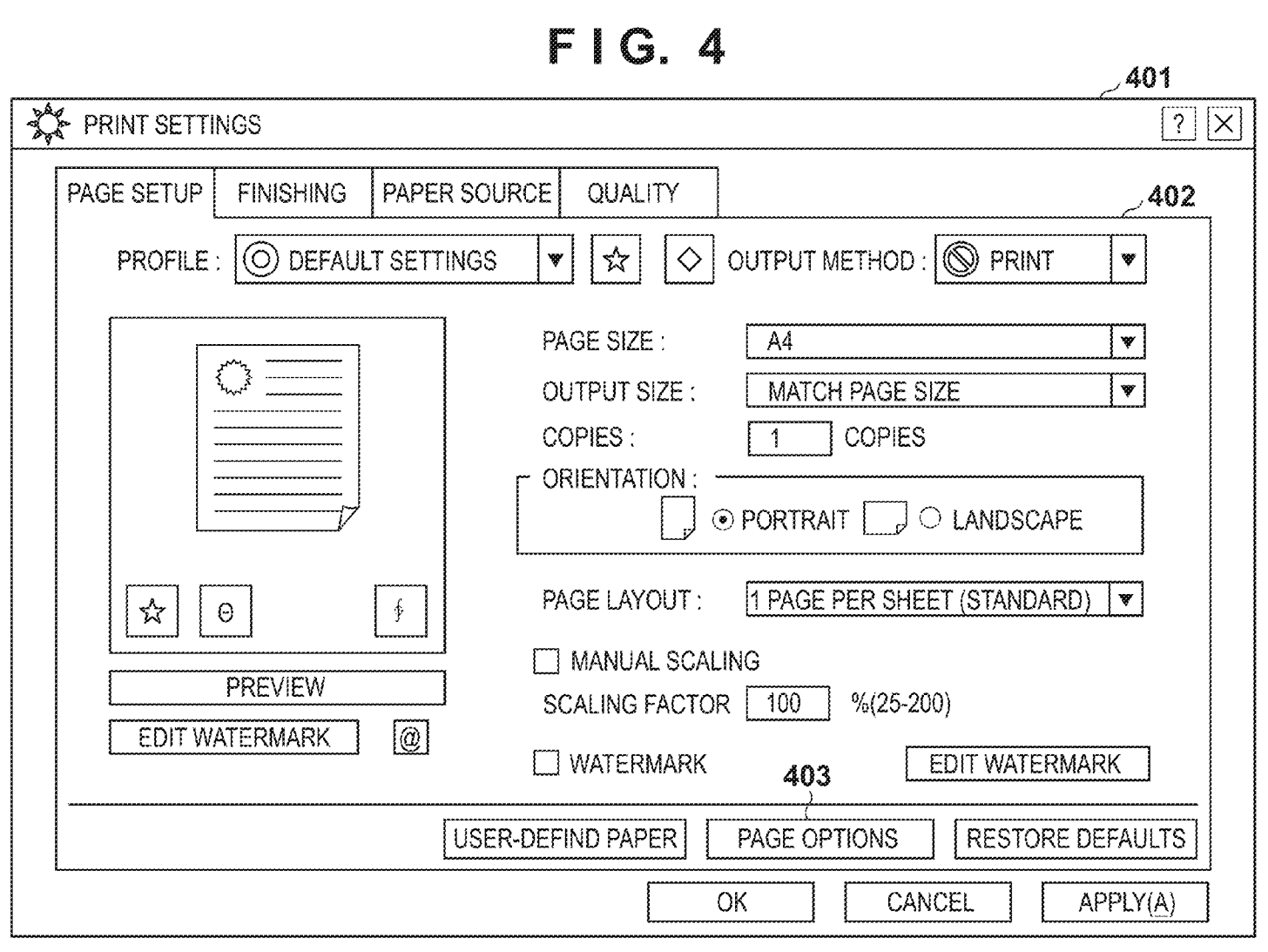

Note that for the extension size, not only the information in the extension level region 2110 but also pieces of information of a page size 403, an output size 404, an orientation 405, a page layout 406, and a magnification 407 in FIG. 4 are used. The scaling factor of the document data is obtained from these pieces of information. The extension size is automatically calculated from the scaling factor and the information in the extension level region 2110.

At this time, the size information of each object may be added. For example, the assumed misregistration amount corresponding to level 100% that is the information in the extension level region 2110 is presented. The relative misregistration amount is obtained from the document data scaling ratio and the size of the object to overcoated by the clear toner, thereby deciding the extension size. The above description specializes in a clear toner. However, the present invention is applicable not only to a clear toner but also to any other spot color printing material having the same application purpose as that of the clear toner.

According to the third embodiment, it is possible to instruct a printer to flexibly extend the clear printing region of PDL data for clear toner printing designated using document data. This allows to apparently reduce the relative misregistration amount between the region to be printed using the clear toner and the pattern that is printed using the color toners as the background of the region to be printed using the clear toner.

Fourth Embodiment

In the first to third embodiments, clear information designated using document data is processed at once. In the fourth embodiment, an example will be explained in which clear information designated using document data is processed divisionally for a full clear page and a partial clear page. Note that only the differences from the first to third embodiments will be described.

Figure 24:
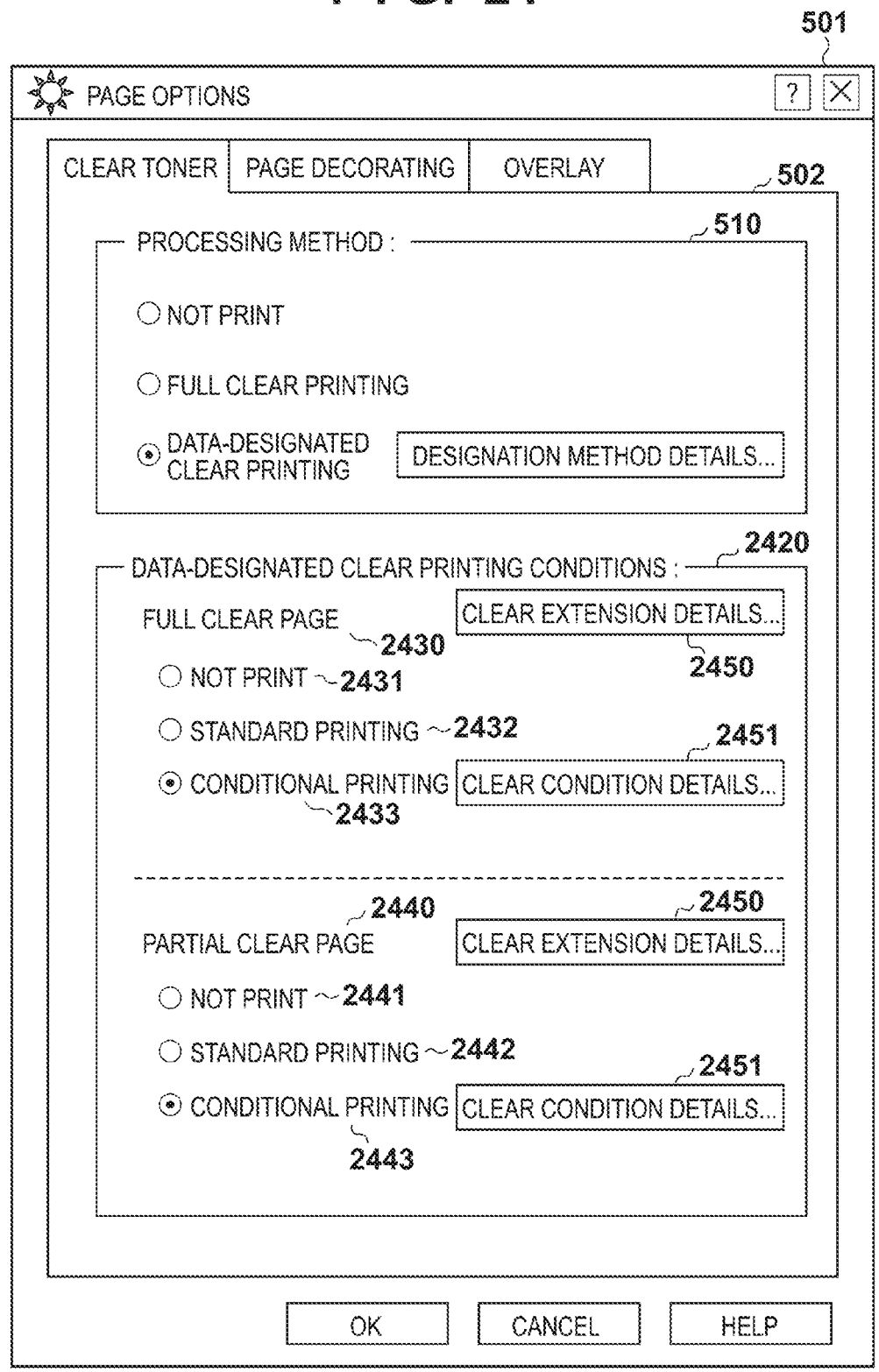
FIG. 24 is a view showing a screen obtained by adding a data-designated clear printing condition region to FIG. 5.

The screen shown in FIG. 24 is obtained by removing a check box 515 and clear conditions from the clear toner setting screen 502 shown in FIG. 5 and adding a data-designed clear printing condition region 2420. In the data-designated clear printing condition region 2420, the user can set print settings divisionally for a full clear page and a partial clear page at the time of clear object printing using document data. A full clear page region 2430 and a partial clear page region 2440 include radio buttons 2431 to 2433 and radio buttons 2441 to 2443, respectively, so as to switch between "not print", "standard printing", and "conditional printing". Each region also includes a clear extension detail button 2450 and a clear condition detail button 2451. Advanced settings can be done in the screen of the third layer displayed by pressing the clear extension detail button 2450 or the clear condition detail button 2451.

Figure 25:
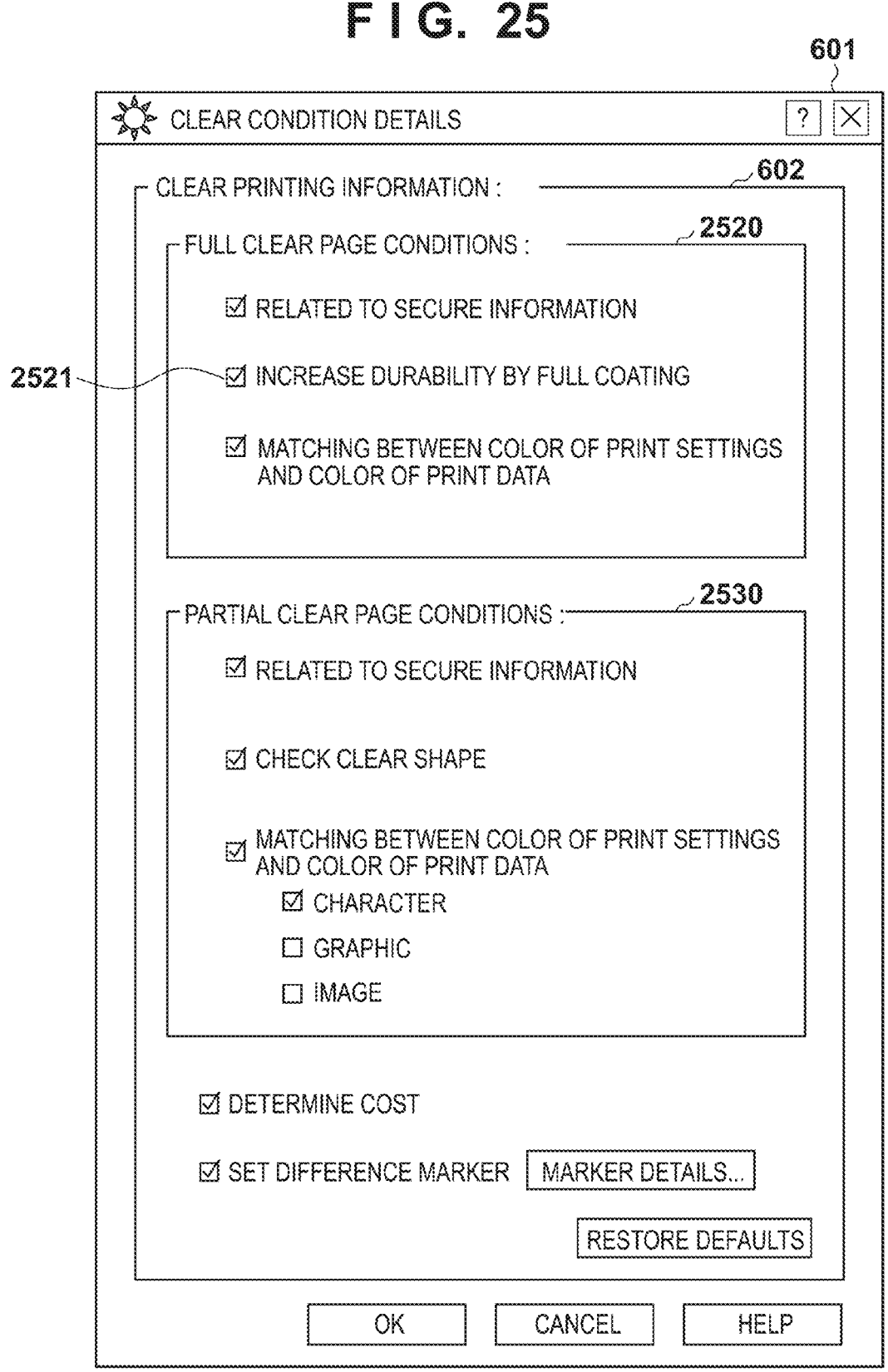
FIG. 25 is a view showing an example of a clear condition detail dialogue screen.

FIG. 25 is a view showing a clear condition detail dialogue screen displayed by pressing the clear condition detail button 2451. Unlike FIG. 6, the screen includes a full clear page condition region 2520 and a partial clear page condition region 2530. A check box 2521 to "increase durability by full coating" is added to the full clear page conditions. This is because the full clear printing may aim at increasing the durability of a print surface, and in that case, the clear toner needs to be applied. In addition, since the full clear printing does not require setting the clear object type, the check box to switch the object is removed from "matching between color of print settings and color of print data".

Figure 26:
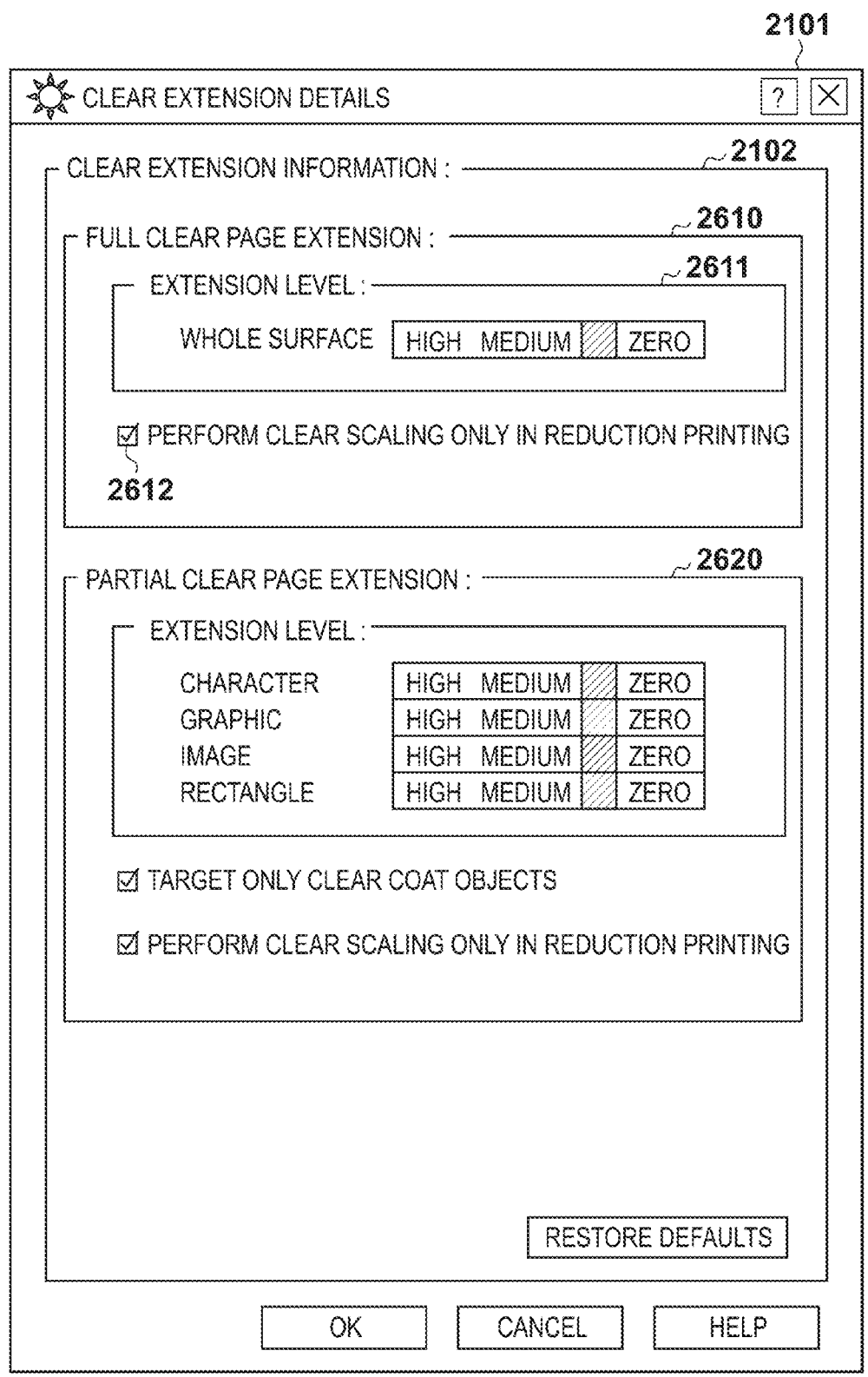
FIG. 26 is a view showing an example of a clear extension detail dialogue screen.

FIG. 26 is a view showing a clear extension detail dialogue screen displayed by pressing the clear extension detail button 2450. Unlike FIG. 21, the screen includes a full clear extension region 2610 and a partial clear extension region 2620. Since the full clear page extension does not require setting the clear object type, an extension level 2611 can be designated only for "full clear". In addition, since full clear printing is performed, "target only clear coat objects" is removed.

According to the fourth embodiment, it is possible to instruct a printer to flexibly switch the presence/absence of clear printing and extension of a printing region between a full clear page and a partial clear page for PDL data for clear toner printing designated using document data.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-093510, filed Apr. 19, 2011 which is hereby incorporated by reference herein in its entirety.

What is claimed is:

1. A printing control apparatus comprising:
   a determination unit that determines whether a limit to prohibit printing using a spot color printing material is imposed on, out of a plurality of objects included in document data, an object set to be printed using the spot color printing material; and
   a control unit that controls to prohibit issuance of a rendering command to print the object using the spot color printing material when said determination unit has determined that the limit to prohibit the printing using the spot color printing material is imposed on the object set to be printed using the spot color printing material,
   wherein said determination unit
   determines whether the object set to be printed using the spot color printing material is an object including secure information, or
   determines whether a color mode of print settings when printing the document data matches a color mode of the document data,
   wherein a marker is set in a page including an object set to be printed using the spot color printing material and determined by said determination unit as an object on which the limit to prohibit the printing using the spot printing material is imposed.

2. The apparatus according to claim 1, wherein said determination unit determines an accounting method when printing the document data, and when it is determined that in the accounting method, accounting occurs if a print surface includes at least one object to be printed using the spot color printing material, and at least one of the objects included in the print surface is determined by said determination unit to be an object set to be printed using the spot color printing material, on which the limit to prohibit the printing using the spot color printing material is not imposed, the limit to prohibit the printing using the spot color printing material is not imposed on other objects set to be printed using the spot color printing material, either.

3. The apparatus according to claim 1, wherein said determination unit determines for each object type whether the color mode of the print settings when printing the document data matches the color mode of the document data.

4. The apparatus according to claim 1, wherein said determination unit performs the determination divisionally for a region in which the printing using the spot color printing material is set on a whole surface of the document data and a region in which the printing using the spot color printing material is set at part of the document data.

5. The apparatus according to claim 1, wherein said determination unit determines for each page whether to perform the printing using the spot color printing material.

6. The apparatus according to claim 1, wherein said determination unit determines for each print surface whether to perform the printing using the spot color printing material.

7. The apparatus according to claim 1, wherein to set a condition to be used for the determination by said determination unit, a candidate of the condition is displayed on a screen.

8. The apparatus according to claim 1, wherein said determination unit determines whether extension printing for extending a printing range of an object to be printed using the spot color printing material is designated, and upon determining that the extension printing is designated, said control unit issues a rendering command to perform the printing using the spot color printing material in a region including the extended range.

9. The apparatus according to claim 1, wherein when said determination unit has determined that the limit to prohibit the printing using the spot color printing material is not imposed on the object set to be printed using the spot color printing material, a flag is generated for the object, and based on the flag, said control unit issues a command to print the object using the spot color printing material.

10. The apparatus according to claim 1, wherein the spot color printing material is a transparent printing material.

11. A printing control method comprising:

determining whether a limit to prohibit printing using a spot color printing material is imposed on, out of a plurality of objects included in document data, an object set to be printed using the spot color printing material; and controlling to prohibit issuance of a rendering command to print the object using the spot color printing material when it is determined in the determining that the limit to prohibit the printing using the spot color printing material is imposed on the object set to be printed using the spot color printing material, wherein in the determining step, it is determined whether the object set to be printed using the spot color printing material is an object including secure information, or it is determined whether a color mode of print settings when printing the document data matches a color mode of the document data, wherein a marker is set in a page including an object set to be printed using the spot color printing material and determined in the determining step as an object on which the limit to prohibit the printing using the spot printing material is imposed.

12. A non-transitory computer-readable storage medium recording a program that causes a computer to execute a printing control method of claim 11.

* * * * *